United States Patent [19]

Trevett et al.

[11] Patent Number: 5,254,979
[45] Date of Patent: Oct. 19, 1993

[54] RASTER OPERATIONS

[75] Inventors: Neil F. Trevett, Kingston-upon-Thames; Malcolm E. Wilson, Bridport, both of England

[73] Assignee: DuPont Pixel Systems Limited, Weybridge, England

[21] Appl. No.: 698,330

[22] Filed: May 6, 1991

Related U.S. Application Data

[63] Continuation of Ser. No. 310,537, Feb. 14, 1989, abandoned.

[30] Foreign Application Priority Data

| Mar. 12, 1988 | [GB] | United Kingdom | 8806839 |
| Mar. 19, 1988 | [GB] | United Kingdom | 8806844 |
| Mar. 23, 1988 | [GB] | United Kingdom | 8806837 |
| Mar. 23, 1988 | [GB] | United Kingdom | 8806838 |
| Mar. 23, 1988 | [GB] | United Kingdom | 8806840 |
| Mar. 23, 1988 | [GB] | United Kingdom | 8806841 |
| Mar. 23, 1988 | [GB] | United Kingdom | 8806842 |
| Mar. 23, 1988 | [GB] | United Kingdom | 8806843 |
| Mar. 23, 1988 | [GB] | United Kingdom | 8806845 |
| Mar. 23, 1988 | [GB] | United Kingdom | 8806846 |
| Mar. 23, 1988 | [GB] | United Kingdom | 8806847 |
| Mar. 23, 1988 | [GB] | United Kingdom | 8806848 |

[51] Int. Cl.$^5$ .................................. G09G 1/14
[52] U.S. Cl. ........................... 345/113; 345/189
[58] Field of Search ............ 340/701, 703, 788, 789, 340/731, 723, 748, 750, 735, 747, 724, 725, 729, 727, 734

[56] References Cited

U.S. PATENT DOCUMENTS

| 3,988,728 | 10/1976 | Inoue | 340/703 |
| 4,148,066 | 4/1979 | Saylor | 340/750 |
| 4,168,488 | 9/1979 | Evans | 340/727 |
| 4,225,929 | 9/1980 | Ikeda | 340/801 |
| 4,295,135 | 10/1981 | Sukonick | 340/734 |
| 4,317,114 | 2/1982 | Walker | 340/721 |
| 4,386,410 | 5/1983 | Pandya | 340/716 |
| 4,412,294 | 10/1983 | Watts | 340/726 |
| 4,435,792 | 3/1984 | Bechtolsheim | 358/166 |
| 4,509,043 | 4/1985 | Mossaides | 340/721 |
| 4,533,911 | 4/1985 | Finegold | 340/727 |
| 4,570,161 | 2/1986 | Kummer et al. | 340/734 |
| 4,580,134 | 4/1986 | Campbell | 340/703 |
| 4,618,858 | 10/1986 | Belch | 340/724 |
| 4,622,546 | 11/1986 | Sfarti | 340/748 |
| 4,648,045 | 3/1987 | Demetrescu | 340/799 |
| 4,648,049 | 3/1987 | Dines | 340/703 |
| 4,656,597 | 4/1987 | Bond | 340/798 |
| 4,667,190 | 5/1987 | Font | 340/798 |
| 4,679,038 | 7/1987 | Bantz | 340/721 |
| 4,689,616 | 8/1987 | Goude | 340/725 |
| 4,692,880 | 9/1987 | Merz | 340/703 |
| 4,808,986 | 2/1989 | Masfield et al. | 340/798 |
| 4,894,646 | 1/1990 | Ryman | 340/727 |
| 4,940,971 | 7/1990 | Hasebe | 340/734 |
| 4,943,937 | 7/1990 | Kasano et al. | 340/799 |
| 4,954,969 | 9/1990 | Tsumura | 340/723 |

FOREIGN PATENT DOCUMENTS

| 0107203 | 5/1984 | European Pat. Off. |
| 0230352 | 7/1987 | European Pat. Off. |
| 0197412 | 10/1986 | United Kingdom |

Primary Examiner—Alvin E. Oberley
Assistant Examiner—Chanh Nguyen
Attorney, Agent, or Firm—Sterne, Kessler, Goldstein & Fox

[57] ABSTRACT

The present invention is a system architecture and methods of operation which reaps all the advantages of patch access processing while allowing many important types of image manipulation to be performed to the granularity and addressability of a single pixel. It goes beyond conventional concepts of the limits of pixel granularity by manipulating pixel data across and within bit planes in a manner which enables bit positions to be exchanged within the same pixel and/or swapped between different pixels.

10 Claims, 18 Drawing Sheets

After Copy

DESTINATION

Note: Destination is used as second source.

RASTER OPERATIONS

This application is a continuation of application Ser. No. 07/310,537, filed Feb. 14, 1989, now abandoned.

BACKGROUND OF THE INVENTION

1. Field of the Invention

The present invention relates generally to image processing and more specifically to an apparatus and method for performing raster operation functions within an image memory.

2. Related Art

Raster operations are used to perform operations on rectangular portions of images. A first (source) rectangular area and a second (destination) rectangular area within an image memory can have any boolean operation performed between them; the result of such boolean operation is then placed in the destination rectangular area. The simplest raster operation simply replaces the destination pixels with the source pixels. This is conventionally done on a pixel-by-pixel basis. Each pixel is addressed, and the read pixel is then moved to its new location in the destination area using a new pixel address. Such a move is commonly referred to as a copy.

Such a simple copy involves a block transfer operation, the pixels at the source locations are copied as a group to the desired destination locations. Typically such a block move is done on a pixel-by-pixel basis. Such a copy results in the movement on the display screen of the copied pixels from the source locations to the destination locations.

More advanced raster operations typically involve boolean operations of the moved pixels so that the pixels at the destination locations reflect the boolean operations that are performed. Such boolean operations allow for desired modifications to the copied portion of the image. As is well known, boolean operations involve logical operations which are performed on the pixels. Boolean operations do not require carries or borrows. They are to be contrasted to arithmetic operations (add, subtract, multiply, and divide) which can require carries or borrows.

One common example of such a conventional boolean operation is that of an image merge. An image merge involves the combining of two images at the destination location. For 1 bit images, two images can be merged using an 'OR' operation. If the background of the images is '0' and any objects in the image are represented by pixels of the value '1', then a logical 'OR' will result in the destination image containing all the objects from both images.

An example of a block copy operation using a logical "OR" will now be explained by reference to FIGS. 1 and 2. Assume a source 102 including a first image is to be block copied to, and "ORed" with a destination area 104 which includes a second image. During a block copy from source to destination, the two areas 102,104 are logically "ORed" resulting in both images appearing in the destination area 104' (FIG. 2). It should be understood that in typical block copy operations where a logical operation is to be performed between the source and destination areas, the destination area effectively serves as a second source for purposes of providing data for the logical "OR".

Excellent discussions of conventional raster operations are found in Section 5-6 "Raster Methods for Transformations", of Hearn, Donald and M. Pauline Baker, Computer Graphics, (Prentice-Hall International, 1986); Chapter 5 "Segments", Harrington, Steven, Computer Graphics- A Programming Approach, McGraw-Hill, Inc., 1983, International Student Edition); Chapter 5 "Clipping and Windowing", Chapter 15 "Raster Graphics Fundamentals", Chapter 18 "Raster-Graphics Systems", Chapter 19 "Raster Display Hardware", of Newman, William M. and Robert F. Sproull, Principles of Interactive Computer Graphics, (McGraw-Hill International Book Company, 1981, International Student Edition); which books in their entirety are incorporated by reference into this application.

SUMMARY OF THE INVENTION

The present invention comprises an new and efficient system and method for performing raster operation block transformation functions within an image memory (which includes the display memory and non-display or off screen memory, if any). In various embodiments, the operations can include a simple copy, any boolean function (including, but not limited to, OR, AND, INVERT, NO OPERATION, XOR, and combinations of these), arithmetic functions (including but not limited to ADD, SUBTRACT, MULTIPLY, DIVIDE and combinations of these), plane swapping and/or masked copies.

A patch approach between the source and destination locations (areas or addresses) as opposed to a pixel-by-pixel approach is used. A patch approach refers to the fact that pixels are accessed from the image (frame) memory in two dimensional patches of pixels (of a preselected rectangular area of adjacent pixels) in one memory cycle.

Patch access systems and methods have the great advantage that image data can be processed in large groups, (e.g. a patch of 20 pixels), thereby significantly increasing the speed at which an image can be manipulated, displayed and stored. For example, where patches defined by arrays of 5 by 4 of eight bit pixels are accessed, frame memory reads and writes will occur 160 bits at a time, thereby increasing the bandwidth of the pixel data bus twentyfold over pixel access systems (i.e. where the pixels are defined by eight bits). Further, the 5×4 patch organization is well suited to a standard high resolution graphic display monitor having 1280×1024 pixels. Organization of the pixel data into 5 by 4 patches means that the screen refresh memory has exactly 256 patches (and therefore addressable locations) in each of the X and Y directions. This type of equal dimension addressability of the image memory and associated display monitor makes many operations conceptually easier to work with and faster to perform.

The drawback of patch access processing is that while the system gains both speed and conceptual simplicity, it looses granularity. In other words, it becomes difficult to operate on groups of data that are less than a patch and to work with images areas not defined within patch boundries.

The system and method of the present invention marks a significant advance in the ability of patch access processors to manipulate images to the granularity of a single pixel and to copy groups pixel data to and from areas not defined within patch boundries.

The inventors have discovered a system architecture and methods of operation which reap all the advantages of patch access processing while allowing many important types of image manipulation to be performed to the granularity and addressability of a single pixel. Further, the inventors have gone beyond conventional concepts of the limits of pixel granularity by discovering a system and method of manipulating pixel data across and within bit planes in a manner which enables bit positions to be exchanged within the same pixel and/or swapped between different pixels.

BRIEF DESCRIPTION OF THE DRAWINGS

The present invention is better understood with reference to the accompanying drawings, which are.

DETAILED DESCRIPTION OF THE PREFERRED EMBODIMENTS

TABLE OF CONTENTS

I. Overview
II. The Preferred Embodiment of the System and Method of the Present Invention
  a) System Environment
  b) Image Data Format
  c) General Operation
  d) Input Patch Register
  e) The Purpose of Shifting and Merging
  f) X Shift and Merge
  g) Time Domain Multiplexing
  h) Y Shift
  i) Line Storage RAM
  j) Logic Unit
  k) Output Multiplexer
  l) Output Patch Register
  m) Write Masking
  n) Page Mode Addressing
  o) Shift Calculation
III. Plane Swapping and Bit Position Manipulation
IV. Modifications and Enhancements
V. Conclusion I. Overview In broad terms the present system and method employs shift logic and a non-displayable RAM area, separate from the image store. The shift logic is used to shift and horizontally merge the patches of an image to be copied. The non-displayable RAM area (the line storage RAM) is used to vertically merge and temporarily store complete lines of the image for copying to a destination location in the image store.

A Logic Unit is also provided for combining the stored image with a destination part of the image in the image store. This allows for one or more image areas stored in the image store to be processed together, using a specified Boolean or arithmetic function.

II. The Preferred Embodiment of the System and Method of the Present Invention

Figure 1:
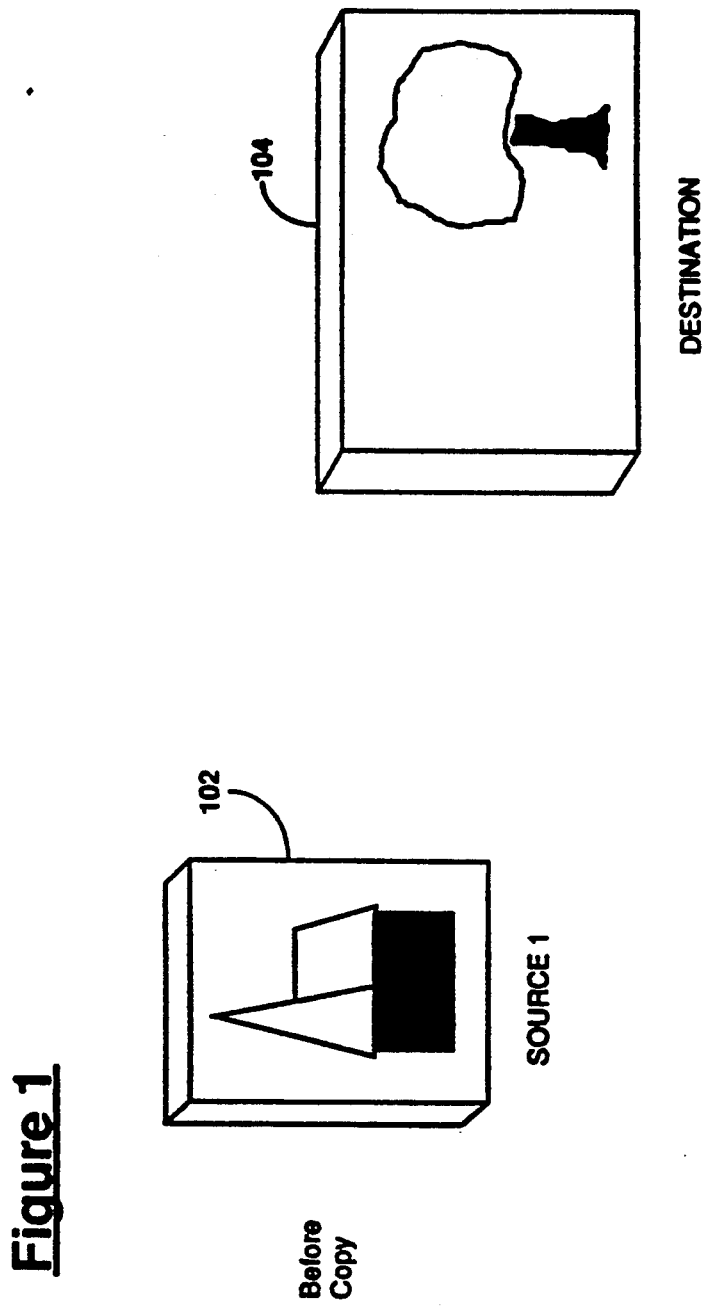
FIG. 1 is a pictorial illustration of a video display screen showing the a source area (source 1) having a first image and a destination area having a second image.
Figure 2:
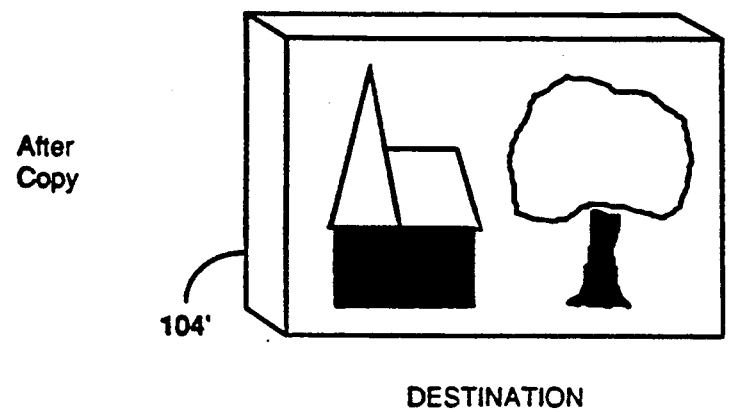
FIG. 2 is a pictorial illustration of the video display screen of FIG. 1 after a block copy with a logical "OR" from the source area of FIG. 1 to the destination area of FIG. 1.
Figure 3:
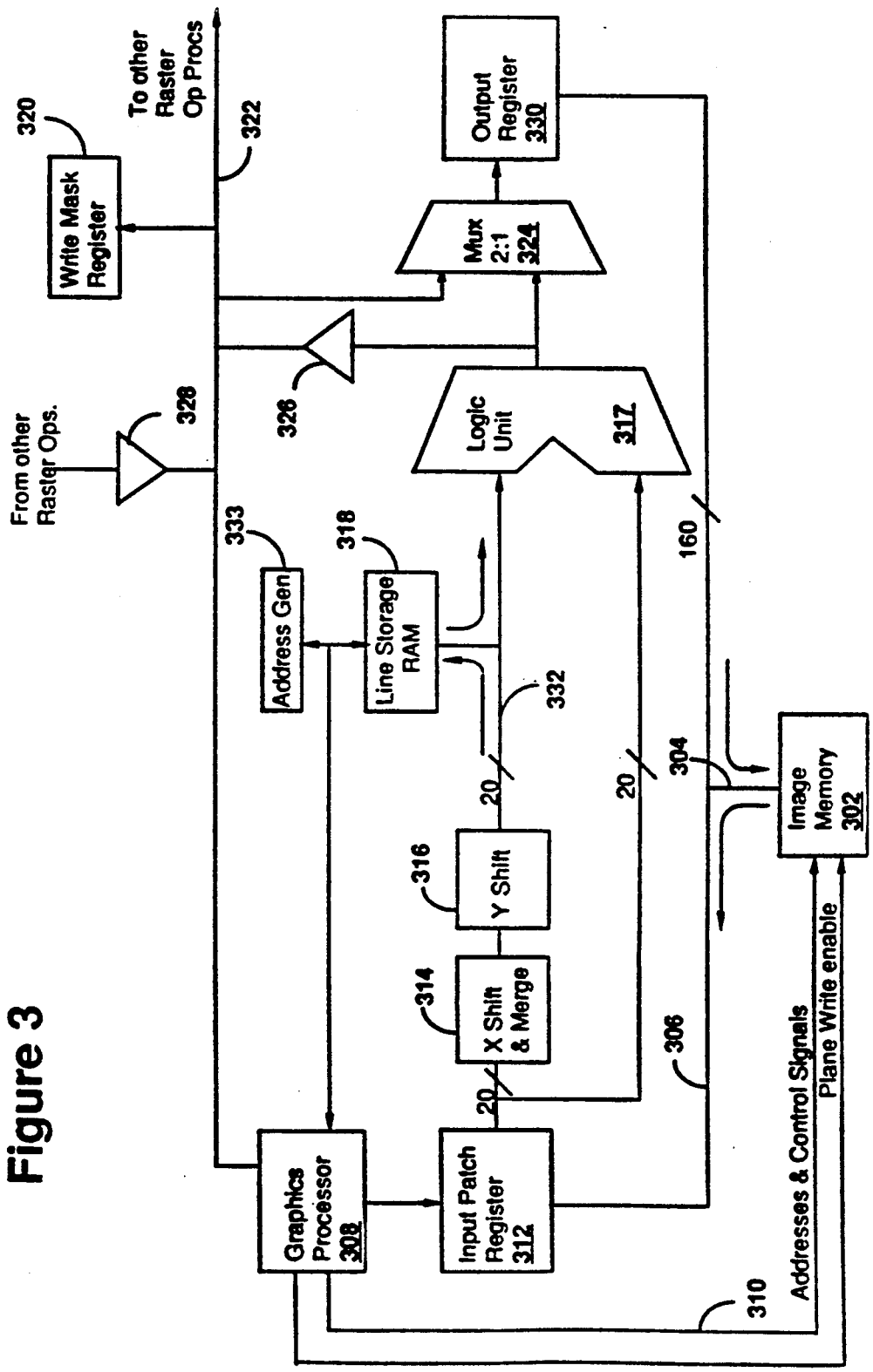
FIG. 3 is a general block diagram of a preferred embodiment of the system (architecture) of the present invention.

A preferred embodiment of the system of the present invention is shown in general block diagram form in FIG. 3.

a) System Environment

Referring now to FIG. 3, an image memory 302 stores a video image by pixels according to a two dimensional memory location format which typically corresponds to the pixel locations of the video display device (not shown). Image memory 302 can be any design utilizing random access storage devices such as dynamic random access memories (DRAM). Preferably, the image store is of conventional design utilizing video RAMs (VRAMs) such as model 53462 VRAMs made by HITACHI of JAPAN. In the presently preferred embodiment, the image memory utilized for this system has the capability to write to any selected subset of image planes while masking non selected planes (i.e. to write to any subset of the bits defining each pixel). Further, the preferred memory is configured to allow page mode access of the VRAMs in the X direction. The preferred image memory is a Du Pont Pixel Systems bFs Framestore, available from Du Pont Pixel Systems Limited (formerly benchMark Technologies Limited), 5 Penrhyn Road, Kingston upon Thames, Surrey KT1 2BT England. It should be understood that these preferred embodiments are only representative and that any suitable random access memory device now known or developed in the future is within the scope of the present invention.

The video display device (not shown) displays the video image stored in the image memory 302. In its preferred embodiment, the video display device is a high resolution raster scan video monitor such as a model GTM 1901-22 made by Sony Corporation of Tokyo, Japan. Such a monitor can accommodate the preferred embodiment of the present invention where the two dimensional video image is 1280 pixels across (row) and 1024 pixels down (column). The present invention contemplates any suitable display device now available or developed in the future.

The image memory 302 has an output port 304 which is connected to a data bus 306. Image memory 302 is caused to output on the data bus 306, pixels stored in contiguous memory locations in response to address signals from a processor 308 supplied by an address-/control bus 310. Processor 308 controls the operation of the various stages (blocks) of the present invention as described below. In its preferred embodiment, processor 308 is a bit slice graphics processor, which controls the various stages of the present invention using microcode instruction words. The preferred processor is a Du Pont Pixel Systems GIP, available from Du Pont Pixel Systems Limited, 5 Penrhyn Road, Kingston upon Thames, Surrey KT1 2BT England. It should be understood that other types of processors can be used by the present invention.

b) Image Data Format

One aspect of the present invention uses a patch strategy for outputting, manipulating, operating on and supplying pixel data. A patch is a group of contiguous pixels of the image memory 302. At a minimum, a patch would be a square group of 4 pixels, 2 across and 2 down. At a maximum, a patch would be the entire number of pixels making up a frame for display on the display device.

Figure 4:
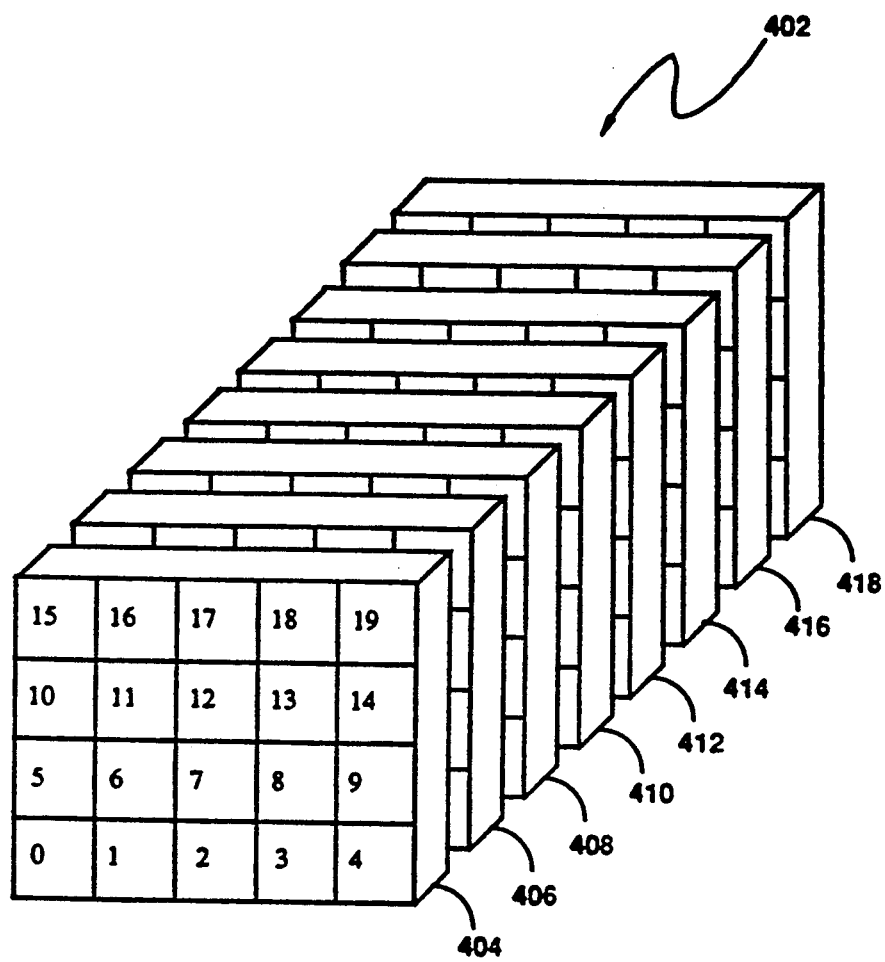
FIG. 4 is a pictorial representation of a preferred format of a patch, showing a 5 by 4 patch having eight planes, and further showing reference numbering (0 to 19) for each pixel position within each plane of the patch.

In the preferred embodiment the patch used is a rectangle 5 pixels across and 4 pixels down, as is shown in FIG. 4. Thus, this preferred patch is made up of 20 contiguous pixels. Each pixel has a specified number of bits which make up a data word. The data word specified for its pixel contains specified information, such as the intensity, or color of the pixel in a continuum (palette) defined by the number of digital states that can be expressed by the digital word. In the preferred embodiment, each pixel word stored in image memory 302 is 8 bits deep. (It should be understood that the word size can be one or more bits depending on the range of the contents and/or certain functions/conditions that need to be stored for the pixel). It thus can be seen that the preferred 5 by 4 pixel patch contains 160 bits of data (5 pixels times 4 pixels times 8 bits per pixel).

The construction of the preferred embodiment of a patch can be better seen by reference to FIG. 4. Figure four shows a 5 by 4 patch (generally referred to by reference numeral 402), having eight planes 404,406,408,410,412, 414,416,418. Each of the planes is a one bit deep slice of the twenty pixels that are defined in the patch 402. In the case of the preferred patch 402 eight bits are used to define each pixel, therefore each patch has eight planes. If, for example, only one bit were used to define each pixel, the patch would have only one plane. In general, a patch will have a number of planes equal to the number of bits used to define the pixels within. For purposes of this specification each plane of a patch will be referred to as a plane or patch plane.

FIG. 4 also shows a numbering scheme for the pixel data within the patch and patch planes. From FIG. 4 it will be observed that the preferred patch has four rows and five columns. The pixel positions within the patch and patch planes are numbered starting at zero (on the lower left) and ending with 19 (at the upper right). These numbers will be used as a reference for purposes of this specification. For example bit 7 of a given patch plane refers to the bit that is (conceptually) in the second row up from the bottom and the third column in from the left. The bit numbering scheme will also apply the 20 bit patch plane data busses referred to in the specification.

Also, for purposes of this specification the rows and columns of the patch planes will be defined. The first patch plane row (row 1) is defined to consist of data positions 0,1,2,3,4. The second row (row 2) is defined to consist of data positions 5,6,7,8,9. The third row (row 3) is defined to consist of data positions 10,11,12,13,14 and the fourth row (row 4) is defined to consist of data positions 15,16,17,18,19. The first patch plane column (column 1) consists of data positions 0,5,10,15. The second column (column 2) consists of data positions 1,6,11,16. The third (column 3) column consists of data positions 2,7,12,17. The fourth column (column 4) consists of data positions 3,8,13,18. The fifth column (column 5) consists of data positions 4,9,14,19.

From the above discussion, it can be observed that the video display screen and image memory can be conceptualized as being made up of a number of horizontal rows of 5 by 4 patches (or of any other given patch dimension). Similarly, any rectangular image area can be conceptualized as being built of these horizontal rows of patches.

For purposes of this specification, a row of patches will be referred to as a "line" or "patch row". This definition is intended to further clarify the distinction between a "line" (which as defined above is a row of patches), and a row of pixels in a patch (or of bits in a patch plane) which will, henceforth, simply be referred to as a "row". The term "column", as used in this specification, refers to the columns of pixels in a patch (or of bits in patch plane).

Also, for purposes of this specification, a one bit deep slice of all the patches forming an image will be referred to as an image plane.

c) General Operation

In the preferred operation of the present apparatus and method, patches of pixel data are accessed from the image memory 302 in response to the address and control data supplied by the graphics processor 308. The patches are loaded one at a time into the input patch register 312. The input patch register outputs a selected plane of each patch to the input of the X Shift and Merge logic 314, and to one input of the Logic Unit 317. Within the X Shift and Merge circuit, the planes of patch data are shifted by a desired number of places in the X direction, and then merged with a plane of data from a horizontally contiguous patch.

From the X Shift and Merge logic the X shifted patch planes are sent to the Y Shift block 316. The Y Shift logic shifts the patch planes by a desired number of rows in the Y direction but performs no merging. The now X and Y shifted patch planes are then stored in an intermediate RAM (i.e. the line storage RAM 318). The line storage RAM serves two purposes. Firstly it merges selected pixel rows from the current and previous input patch plane rows to form complete output patch planes. Secondly, it stores entire lines of complete shifted and merged patch planes so that they can be read directly back into the image memory 302 in page mode.

From the line storage RAM 318, the newly formed patch planes go to the Logic Unit 317. The logic unit performs Boolean operations between the newly formed patch planes and the destination patch data (a plane of which will be properly ready at one of the logic units' inputs). From the logic unit 316, several things can happen to the patch planes. First, a patch plane may be used to load the write mask register 320 of the graphics processor 308. Second, an individual plane can be replaced with a plane from another raster operation processor on the secondary data bus 322 through the operation of the 2:1 MUX 324. Two tri-state buffers 326,328 control the flow of mask data between other raster operation processors and the present system. Last, (and most commonly), the planes may be passed through the 2:1 MUX to the output register 330, and then written immediately to the image memory. The process is then repeated for the remaining patch planes to be copied.

Preferably, a complete source rectangle is processed by processing one (non TDM) or two (TDM) image planes at a time, and then going back to do the next image planes. Preferably, the most significant image planes are processed first to reduce the visual breakup effect. In the context of the present apparatus and method, the term most significant refers to the image planes most effecting the integrity of the displayed image. Typically, the most significant image planes occupy the higher order bits of the pixels within each image patch.

For the purpose of clarity, the present apparatus will be referred to as the Blit (block transfer) Processor.

d) The Input Patch Register

The purpose of the input patch register 312 is to collect the 160 bits of data associated with each complete patch and allow the Blit Processor to select any one given plane (i.e. 20 bits, one bit from each pixel) for processing. In the presently preferred embodiment, raster operations are performed on the image either one (non TDM) or two (TDM) planes at a time, until the complete destination image data has been formed. In order to accomplish this, the input patch register 312 holds the complete 160 bit patch, and outputs the selected plane to be processed in response to control data from the graphics processor 308.

Figure 9:
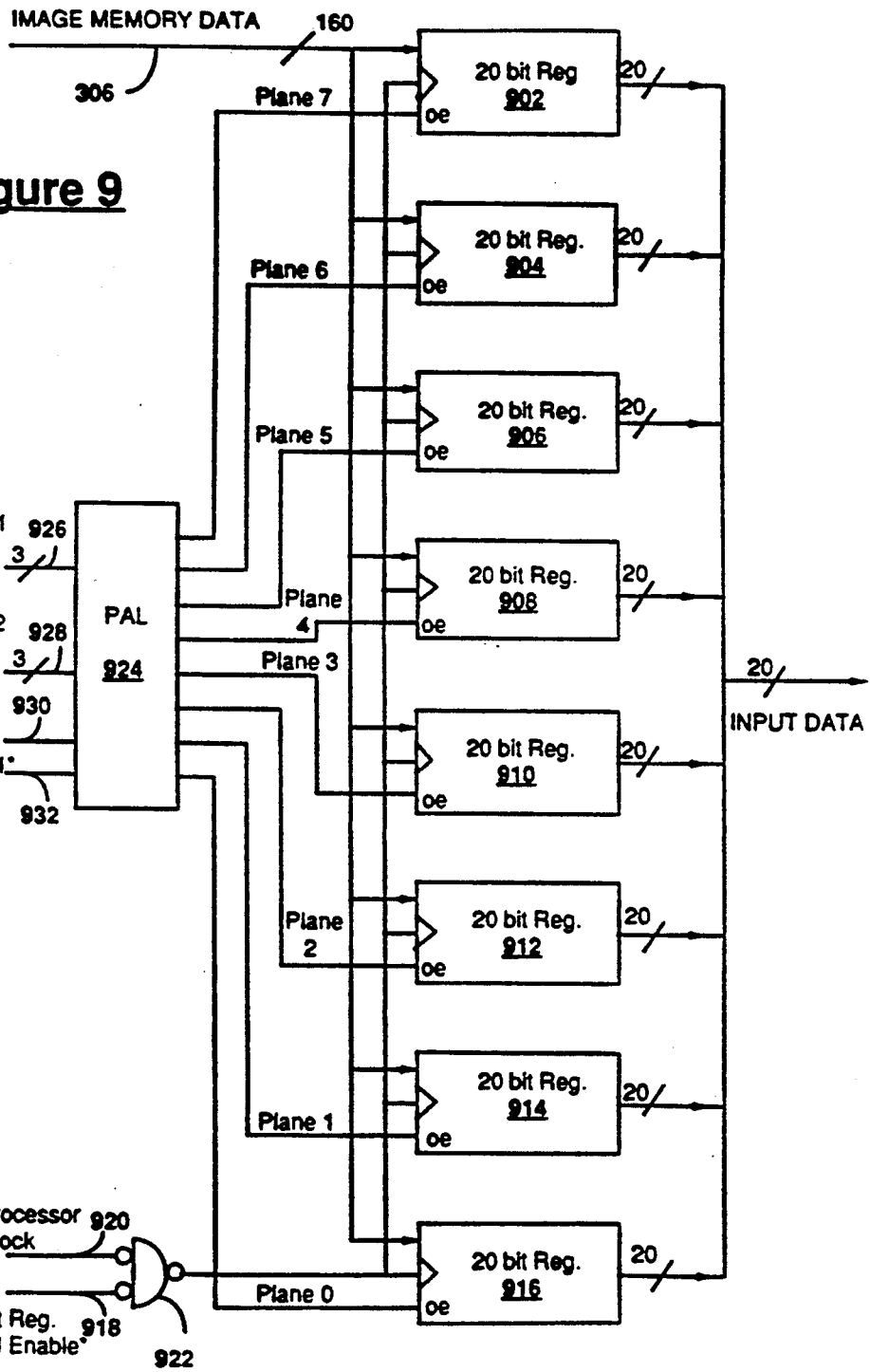
FIG. 9 is a more detailed block diagram of a preferred embodiment of the input patch register block 312 of FIG. 3 for storing patches and for providing patch planes.

The input patch register (FIG. 9) includes eight, 20 bit registers 902,904,906,908,910,912,914,916 each of which receives one plane of the patch data on the bidirectional data bus 306. When it is desired to load the registers, the graphics processor 308 asserts (low) the input register load enable* line 918 on the gate logic 922. This enables the processor clock 1000 (on line 920) to load the input registers with the full 160 bit patch from the bidirectional data bus 306. The processor clock 1000 is generated by the graphics processor 308 and is cycled once for every patch output by the image memory 302 on the image memory data bus 306. From FIG. 9 is can be seen that the entire 160 bit patch, on the image memory data bus 306 is loaded into the input registers in parallel. Once the patch data has been loaded into the registers, the Blit processor may begin it's operation.

A PAL 924 is used to control the output enable lines of the input registers, thereby controlling which plane is to be processed by the Blit Processor. In order to select which of the eight planes (20 bits) to output, the PAL uses 8 control lines which are preferably generated by the graphics processor 308. These lines include: three input register phase 1 input plane select lines 926, (which will cause the PAL 924 to select a given plane for the first phase of a time domain multiplexed blit operation); three phase 2 input plane select lines 928, (which will cause the PAL 924 to select a given plane for phase 2 of a time domain multiplexed raster operation), a Dual* line 930 (low true), used to tell the PAL whether a single phase (not time domain multiplexed) or dual phase (time domain multiplexed) operation is to be performed, and a phase 1* line 932 which is used to tell the PAL 924 which phase of a time domain multiplexed operation is occurring so that it will properly choose between its phase 1 and phase 2 plane select inputs. The timing of the Processor Clock 1000, the Phase1* signal 1006 can be seen in FIG. 10.

For non TDM (single plane) operations the Dual* line 930 is held constantly high and the phase1* line is held constantly low. This will cause the PAL 924 to always select the plane identified on its phase 1 plane select inputs. For TDM operation, the Dual* line 930 is held constantly low while the phase 1* line cycles. This will cause the PAL 924 to select the plane identified by the phase 1 plane select inputs when the phase1* signal 1006 (line 932) goes low and that identified by the phase 2 plane select inputs when the phase1* signal goes high.

When the input register Load Enable* signal line is held low, the patch planes will be clocked into their corresponding registers. The registers for the selected patch plane will be output enabled by the PAL 924, and will be available for processing.

e) The Purpose of Shifting and Merging

In order to perform pixel aligned raster operation block transformation functions within a patch access image memory 302 (such as the preferred image memory), it is necessary to be able to perform shift and merge operations in two (X and Y) directions. In a patch access processor, pixels are accessed from the image memory as part of a two dimensional patch. Because the raster operations are required to operate to any pixel, the source patches must be shiftable in two dimensions so that the source pixels will correspond to the required destination pixels. Additionally, although the shifting operation moves the output pixels to the correct position, the output patches formed by the shift cannot be directly written to the image memory as the pixels in the shifted patch do not belong in the same destination patch. Thus it is necessary to merge the shifted patches to form patches that can be stored in the image memory.

Figure 5:
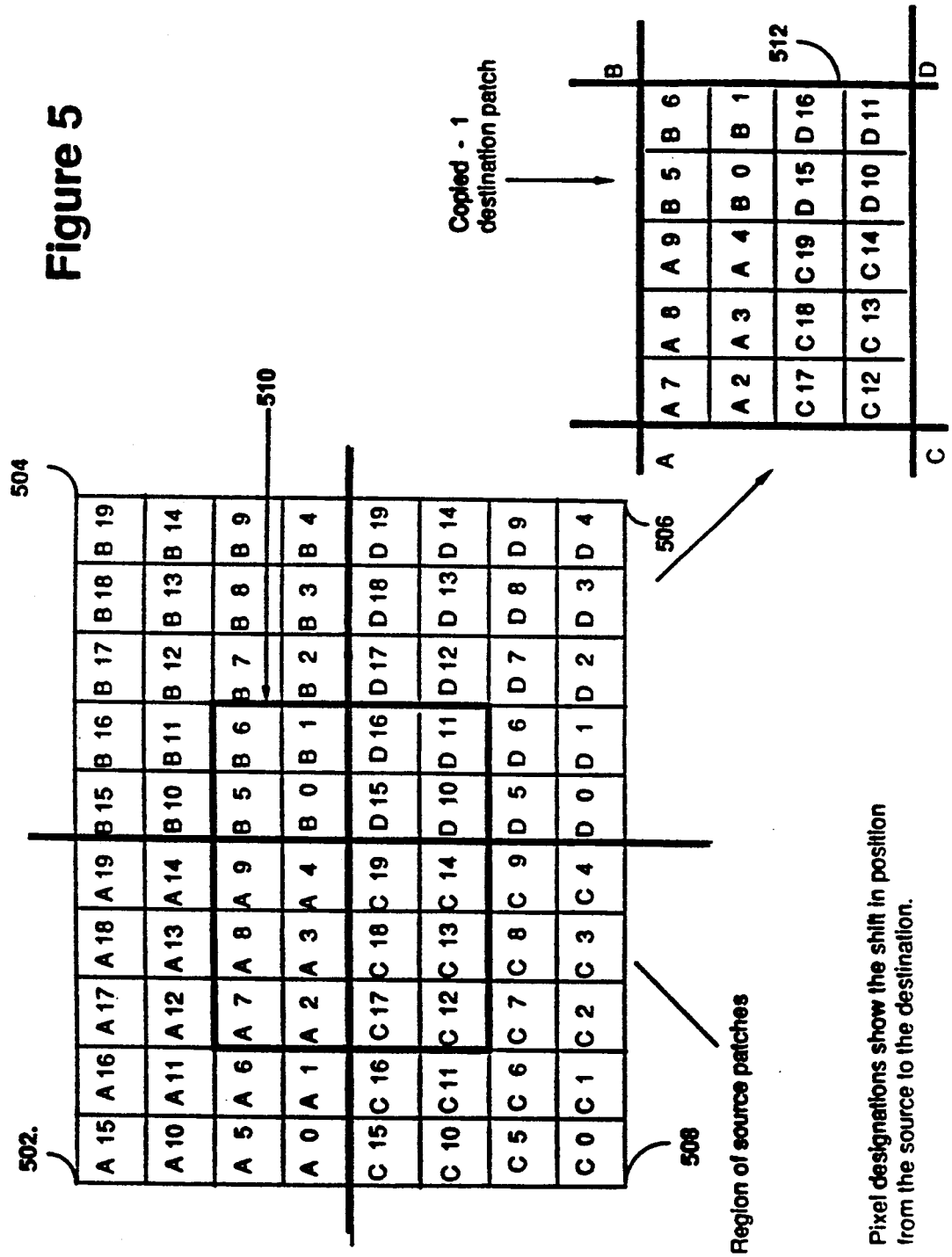
FIG. 5 shows a map for illustrating the two dimensional shift and merge operations necessary to perform pixel (or bit) aligned raster operation by reading and writing patches (or patch planes)

The necessity for the shift and merge operations can be better understood by reference to FIG. 5. This figure shows a source region of the image memory 302 consisting of four patches (502, 504, 506, 508). Each patch consists of data representing a 5 by 4 array of pixel data. Assume it is desired to copy a group of pixel data 510 (outlined in bold), that is not on a patch boundary to a patch addressed destination area 512. The programmer encounters a problem because in typical patch access processors, the image memory is only addressable to the granularity of its patch boundaries.

One solution to this problem is to read the data for all four patches 502,504,506,508 and merge the data into a new patch consisting of the data in section 510. The merged data can then be put onto the bidirectional bus 306 and written into the destination area 512 of the image memory 302. Advantageously, the Blit processor shifts and merges patches in page mode (i.e. a row of patches at a time), thereby saving time on the overall operation.

All of the circuitry in the preferred embodiment of the shift logic has been designed to process 5×4 patches. Therefore, unless otherwise stated, the reader should assume 5×4 patches or patch planes are being processed.

f) X Shift and Merge

Figure 6:
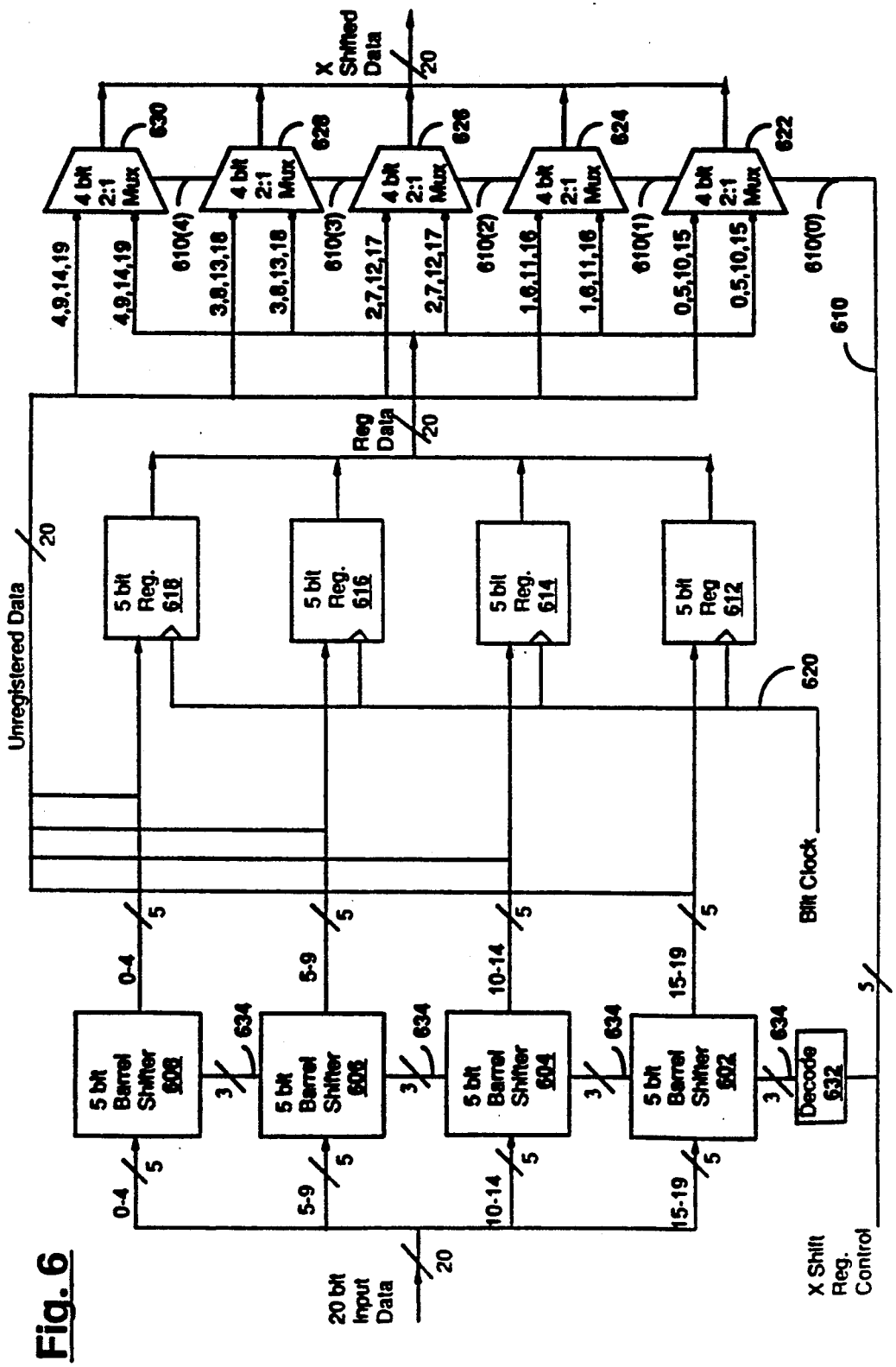
FIG. 6 is a more detailed block diagram of a preferred embodiment of the X shift and merge block 314 of FIG. 3 for implementing the X shift and/or merge function of the present invention.

The X shift and merge logic 314 may be better understood by reference to FIG. 6. From FIG. 6 it may be seen that the X shift and merge logic includes four, 5 bit barrel shifters 602, 604, 606, 608. Each barrel shifter handles one complete row of each patch plane. As has been stated, the Blit Processor shifts and merges one plane of patch data at a time. Therefore, each row of the preferred 5×4 patch plane consists of 5 bits of information. A first barrel shifter 608 receives its input from bits 0 through 4 (row 1) of the output of the input patch register 312. A second barrel shifter 606 receives its input from bits 5 through 9 (row 2) of the input patch register 312. A third barrel shifter 604 receives its input from bits 10 through 14 (row 3) of the input patch register 312. A fourth barrel shifter 602 receives its input from bits 15 through 19 (row 4) of the input patch register 312. The barrel shifters will circularly shift the rows of patch data to the left or right a number of places based on data appearing on the 5 bit wide X shift control bus 610. A decoder PAL 632 decodes this data into 3 bits of shift control data which is used by the barrel shifters. Each barrel shifter receives all three lines of the decoder output 634 at its shift control input. The decoder PAL 632 will be further described later.

From the barrel shifters, each row of X shifted data is clocked into one of four 5 bit registers 612,614,616,618. Each barrel shifter 602,604,606,608 has one corresponding 5 bit register 612,614,616,618 to receive its shifted data. The clocking of data into the 5 bit registers is controlled by a global blit clock 1004 on line 620.

The blit clock 1004 (FIG. 10) generally controls the operation of the Blit Processor. Every time the processor clock 1000 is cycled, a new patch of data is clocked into the input patch register 312. Every time the blit clock 1004 is cycled a selected plane of the patch is clocked out of the input patch register. The blit clock controls other functions as well which are explained within.

As the first plane of data is clocked into the five bit registers, (the processor only operates on one given plane at a time), a new corresponding plane of data from the next horizontally contiguous patch is processed by the barrel shifters and appears at the inputs of the 5 bit registers. At the end of each blit clock cycle, 8 bits of data are available at the inputs to each of the five, 4 bit 2:1 Multiplexer (MUXes) 622,624,626,628,630. Each MUX handles one of the five columns of data from each patch plane. For purposes of clarity, the data held in the 5 bit registers will be referred to as the previous patch plane and the data at the registers After passing through the barrel shifters, the patches would appear as below:

| Previous Patch | Current Patch |
|---|---|
| A18-A19-A15-A16-A17 | B18-B19-B15-B16-B17 |
| A13-A14-A10-A11-A12 | B13-B14-B10-B11-B12 |
| A08-A09-A05-A06-A07 | B08-B09-B05-B06-B07 |
| A03-A04-A00-A01-A02 | B03-B04-B00-B01-B02 |

The X shift and merge logic would form a new patch as follows:

| | | | |
|---|---|---|---|
| A18- | A19- | B15- | B16-B17 |
| A13- | A14- | B10- | B11-B12 |
| A08- | A09- | B05- | B06-B07 |
| A03- | A04- | B00- | B01-B02 |

In the above example it will be seen that two of the five, four bit 2:1 multiplexers (in this example 622, 624) would select the first two columns of the previous patch plane and merge them with the last three columns of the current patch plane selected by the remaining three multiplexers 626,628,630. Once set, the multiplexer programming can remain stable for the entire raster (block copy) operation. inputs will be referred to as the current patch plane. Each multiplexer receives at its inputs one column from the previous patch plane, and the corresponding column from the current patch plane. Under control of data on the X shift Control bus 610, the 2:1 MUXes will merge the previous patch plane with the current patch plane. Each bit of the control bus 610(0),610(1),610(2),610(3),610(4) directly controls one MUX.

The X direction merge operation is better understood by way of example. Assume the two contiguous patches of pixel data in example 1-1 below are to be shifted to the left by three places.

EXAMPLE 1-1

| First Patch | Second Patch |
|---|---|
| A15-A16-A17-A18-A19 | B15-B16-BA7-B18-B19 |
| A10-A11-A12-A13-A14 | B10-B11-B12-B13-B14 |
| A05-A06-A07-A08-A09 | B05-B06-B07-B08-B09 |
| A00-A01-A02-A03-A04 | B00-B01-B02-B03-B04 |

The programming of the Decoder PAL 632 will now be explained. From the above example it will be seen that the barrel shifters 602,604,606,608,610 and the MUXes 622,624,626,628,630 work in conjunction with each other. For example, if a previous patch plane has been shifted left N number of places, the MUXes must select the first 5-N columns of the previous (registered) patch plane and the last N columns of the current (unregistered) patch plane (as shifted by the barrel shifters).

The formula works in reverse as well. The 5 bits of X shift control data is used to select the first 5-N columns of the previous patch plane, and the first N columns of the current patch plane by controlling the select inputs of the 5 2:1 MUXes 622,624,626,628,630. The decoder PAL 632 is programmed to ensure that the 3 bits of barrel shifter control data will cause a circular shift of N. If each MUXes current (unregistered) input is selected by asserting a logical 1 on the X shift register control lines 610, then the decoder PAL 623 merely needs to convert the number of 1's on the X shift register control lines 610 into a 3 bit binary number so as to cause the barrel shifters to shift by a number of places equal to N.

In the preferred embodiment, X shifting is only done to the left while Y shifting can be done up or down. It is necessary to be able to shift up or down in Y in order to cope with overlapping source and destination rectangles i.e. if the destination overlaps the bottom of the source the copy must take place top to bottom in order to read out the source before it is overwritten by the destination. In the X direction there is no problem due to the blit RAM. This is because a complete row is always processed before writing to the destination. It should be understood, that while the presently preferred embodiment shifts only to the left, X shifting could just as easily be done to the right. Because the X shift is circular (cyclic), a shift to the right of N is the exact equivalent of a shift to the left of 5−N.

From the above description it will be seen that for every cycle of the Blit clock, a new X shifted plane of data will output from the X shift and merge logic 512.

g) Time Domain Multiplexing

Advantageously, the X Shift and Merge logic can be modified to process more than one plane at a time through the use of time division multiplexing (TDM). An embodiment of the X shift and Merge Logic suitable for both TDM and non TDM operation will be described by reference to FIG. 12. For the most part, this TDM operation involves doubling the speed of the Blit clock and processing two planes from each patch in each processor clock cycle. The input patch register 312 operates as usual, except that in the first Blit clock cycle, one plane from the "clocked in" patch is selected and on the next Blit clock cycle another plane is selected. It should be remembered that for TDM operation, the blit clock 1004 (the clock used to clock out of the input patch register 312) is running twice as fast as the processor clock 1000 (i.e. the clock used to clock complete patches into the input patch register 312). Similarly, the operation of the output patch register 330 is adjusted so as to load two patch planes for writing to the image memory in each clock cycle as opposed to just one.

Figure 12:
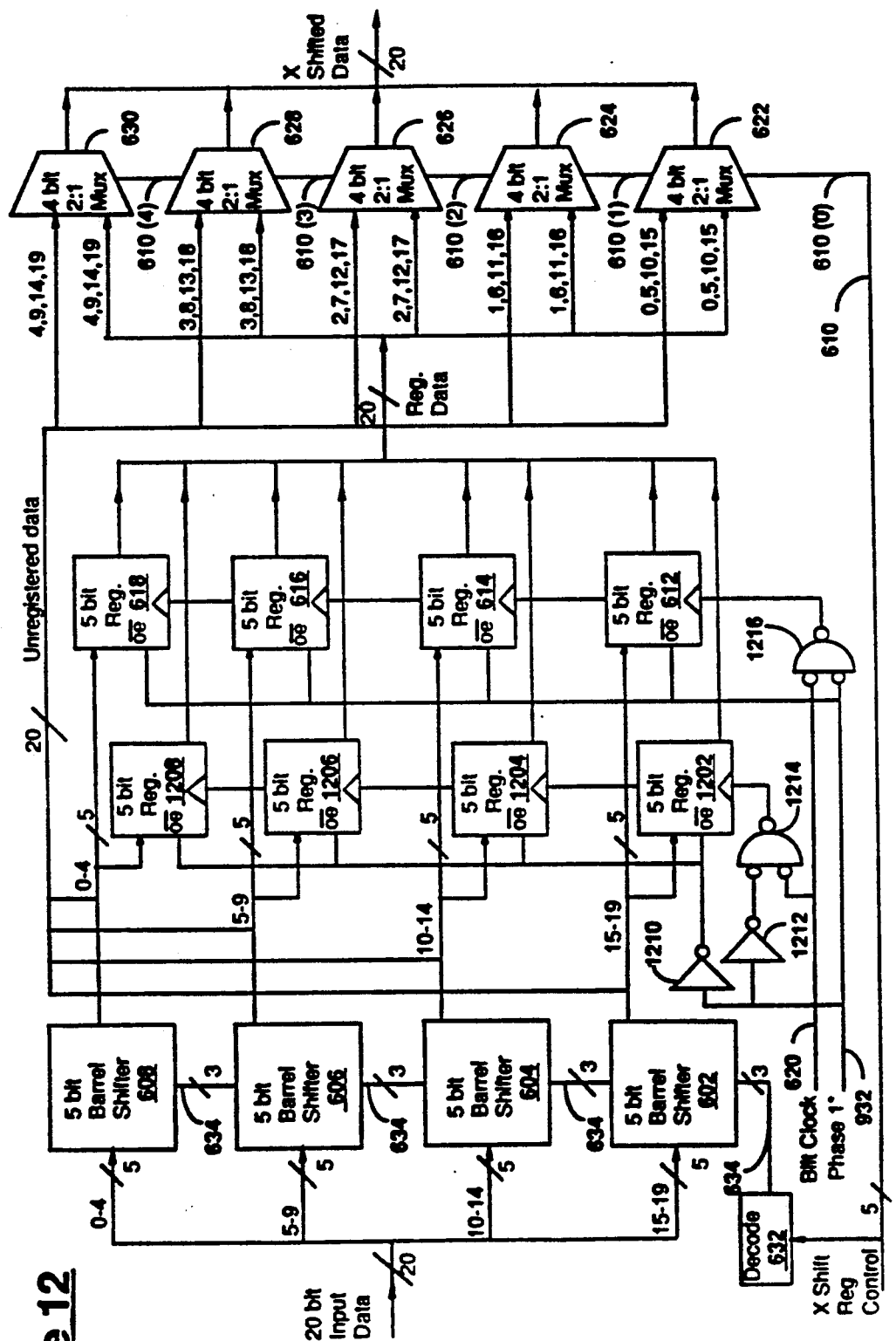
FIG. 12 is a more detailed block diagram of an alternative preferred embodiment of the X shift and merge block of FIG. 3, which is suitable for time domain multiplexing.

The FIG. 12 embodiment of the X shift and merge logic is similar to the FIG. 6 embodiment except that a second set of four registers 1202,1204,1206,1208 and several gating circuits 1210,1212,1214,1216 are added. In addition, the graphics processor 308 provides a phase 1 signal 1006 which is asserted low for the first phase pixel plane in the processed patch and asserted high for the second phase pixel plane. In other words, there are in effect two complete sets of storage registers in the X shift merge circuit. Each set is used only in one phase of a dual phase patch cycle; one for each plane.

From FIG. 12 it can be seen that all of the clocks inputs for the first set of registers 612,614,616,618 are tied in common to the output of a first gate 1216, and the clock inputs of the second set of registers 1202,1204,1206,1208 are tied in common to the output of a second gate 1214. The gates will allow data to be clocked only into the first set of registers during the first phase of a TDM operation (i.e. while the phase 1* signal asserted low). The gates will allow data to be clocked only in to the second set of registers during the second phase of a TDM operation (i.e. the phase 1* signal asserted high). Similarly, the inverters 1210,1217 will output enable the first set of registers when phase1* is low and the second set of registers when phase1* is high.

A TDM operation can be conceptualized as occurring in two phases. The first phase begins when a first patch is clocked into the patch input register 312. During the first phase, a first plane of this patch is selected for processing. When the first plane arrives at the X shift and merge logic, it is processed in the same way as it was for in the single plane embodiment. Because the graphics processor has asserted the phase 1* signal low, the shifted data is clocked into the first set of 5 bit registers 612,614,616,618. The graphics processor 100 then unasserts (sets high) the phase 1* signal and a second patch plane in the patch input register 312 is selected. The second plane (of the first patch) is shifted and loaded into the second set of registers 1202,1204,1206,1208. As has been stated, during the assertion (low) of the phase 1* signal the first set of 5 bit registers will be load and output enabled and the second set will not. During its unasserted (high) time, the second set of 5 bit registers will be load and output enabled and the first set will not.

As the second patch plane of the first patch is being clocked into the second set of 5 bit registers, a second patch is loaded into the input patch register 312. When the phase1* signal again goes low, the input patch register first selects the same patch plane as was clocked in during the first phase1* low time. For example, if patch plane 1 for the first patch was initially selected then patch plane 1 of the second patch will also be initially selected). The selected patch plane (of the second patch) is shifted by the barrel shifters and appears at the inputs of the registers and the 2:1 MUXes. Because the phase 1* is asserted (low) only the first set of registers will be output enabled. Under the control of 1 bit each of the X shift control bus 610, the MUXes perform the merge operation between the first patch planes from the first and second patches. On the next blit clock (which marks the beginning of the second phase) the current (unregistered) data will be loaded into the 1st set of 5 bit registers 612,614,616,618.

In the second phase of the same processor clock cycle the second plane (of the second patch) is selected by the patch input register (i.e. the plane which was selected second for the first patch). The graphics processor unasserts the phase 1* signal (sets it high) and the second set of 5 bit registers is output enabled. The 2:1 MUXes will merge the second selected planes from the first and second patches. On the next blit clock, the second plane of the second patch is clocked into the second set of 5 bit registers. The cycle continues until all of the patches for a full row of patches have been processed.

Figure 10:
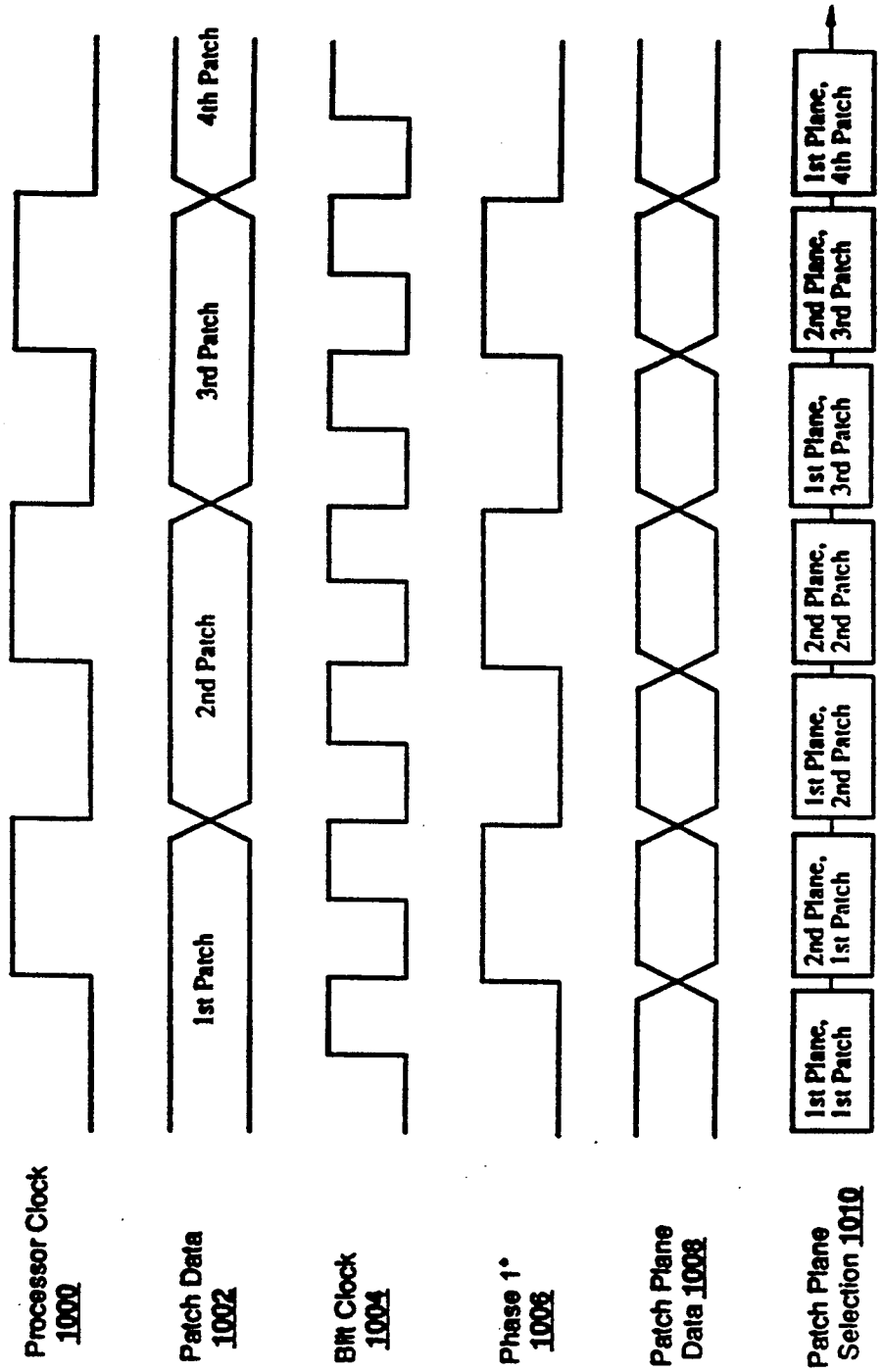
FIG. 10 is a timing diagram of several of the clock and data signals used in the time domain multiplexed (TDM) mode as utilized by the embodiment of the X shift and merge block 314 of FIG. 12 and various other system blocks.

The timing of a TDM operation using the circuit of FIG. 12 may be better understood by reference to FIG. 10. As will be understood from FIG. 10, in a TDM operation the Blit Clock 1004 goes through two cycles for every patch of data clocked into the input register 312 from the bidirectional data bus 306. This patch data is represented by reference numeral 1002. The relative timing of the blit clock and the patch data results in two patch planes being clocked out of the Input Patch Register 308 (represented by reference numeral 1008) for every patch that is clocked in. The Phase 1* signal cycles once for every patch clocked in, resulting in the first patch plane of each patch being clocked into the first set of registers of the X shift and merge logic, and the second patch plane being clocked into the second set of registers. The processing sequence for a line of patch planes is represented by reference numeral 1010.

Figure 11:
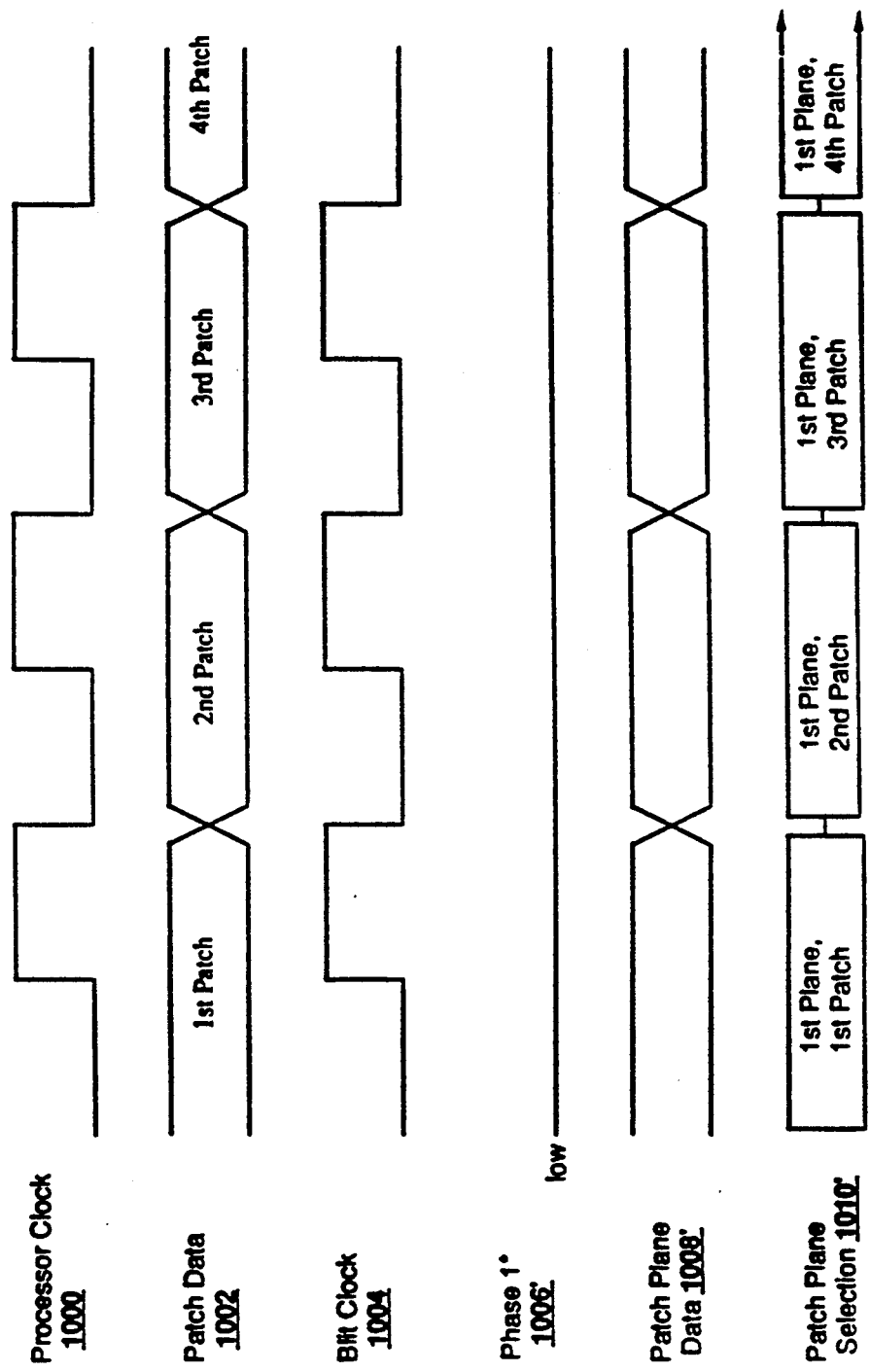
FIG. 11 is a timing diagram of several of the clock and data signals used in the non time domain multiplexed mode as utilized by the X shift and merge block 314 of FIG. 12 and various other system blocks.

For non TDM operation (FIG. 11), the circuit of FIG. 12 is operated somewhat differently. For non TDM (i.e. single phase) operation, the Blit clock 1004 is cycled only once for every patch clocked into the input registers and the phase 1* signal 1006' is held permanently low. This timing results in only one patch plane being clocked out of the input register (as represented by reference numeral 1008') for every patch clocked in. The result is that rows of patch planes are processed in the general order shown by reference numeral 1010'. The phase 1* clock being held low results in the circuit of FIG. 12 operating in the same manner as the circuit of FIG. 6.

The X Shift and Merge logic is easily modified to work with other patch formats (aside from the preferred 5×4). The barrel shifters 602,604,606,608,610 should have one bit for every patch column, as should the registers. One 2:1 MUX should be provided for every patch column and the MUXes should be as wide as the number of patch rows. In it's preferred embodiment, the X Shift and Merge logic is embodied using programmable logic arrays (PALs).

Throughout this specification, the term contiguous is used. The meaning of this term is better understood in the context of the two dimensionally addressable image memory 302. Because the memory is addressed in the same manner as the video screen, data may be thought of as being stored in an array of columns and rows. A given patch will therefore have two contiguous patches in the vertical (Y) direction (i.e. one on the patch row below and one on the patch row above), and two contiguous patches in the vertical (Y) direction (i.e. one on each of the patch columns to either side).

h) Y Shift

Figure 7:
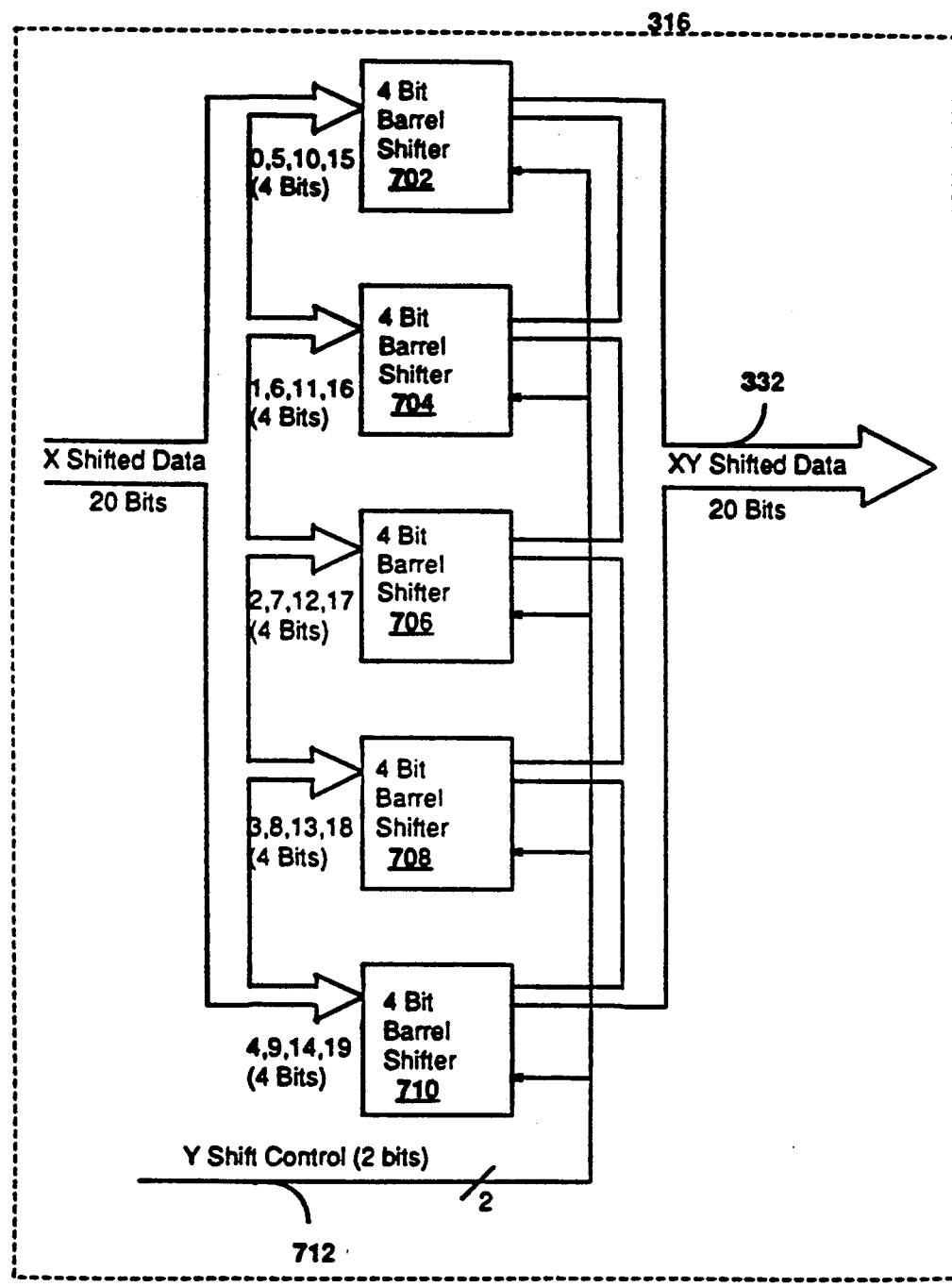
FIG. 7 is a more detailed block diagram of a preferred embodiment of the Y shift block 316 of FIG. 3 for implementing the Y shift function of the present invention.

The Y Shift Logic 316 is better understood by reference to FIG. 7. X shifted patch planes from the X Shift and Merge logic 314 is received by the Y Shift Logic 512. Within the Y Shift Logic, five 4 bit barrel shifters 702,704,706,708,710 are used to shift the patch plane rows up or down under control of 2 bits of data on the Y Shift control lines 712. One complete column (4 bits) of patch plane data is loaded into each barrel shifter.

The first column (consisting of data from positions 0,5,10 and 15 on the X shifted patch plane), is loaded into the first barrel shifter 702. The second column consisting of data from positions 1,6,11 and 16 on the X shifted patch plane is loaded into a second barrel shifter 704. The third column, consisting of data from positions 2,7,12,17 on the X shifted patch plane is loaded into a third barrel shifter 706. The fourth column consisting of data from positions 3,8,13,18 on the X shifted patch plane is loaded into a fourth barrel shifter 708. The fifth column consisting of data from positions 4,9,14 and 19 on the X shifted patch plane is loaded into a fifth barrel shifter 710.

The two Y shift control lines 712 are controlled by the graphics processor 308. The two bits of Y shift information carried is sufficient to cause the Y barrel shifters 702,704,706,708,710 to circularly shift the four rows of each patch plane up to three places in the Y direction. A shift of four places in the Y direction is not necessary because it would merely put the 5×4 patch plane back where it started. It will be seen that as the shift is circular, negative shifts are easily achieved i.e. a negative shift of 1 is equivalent to a positive shift of three.

After being processed by the Y barrel shifters, the Y shifted patch planes will appear at the output of the Y shift logic 316 and be sent to the Line Storage RAM 318 for Y merging and row collection.

i) The Line Storage RAM

The line storage RAM 318 serves two purposes. Firstly it merges selected rows from the current and previous input patch plane rows to form complete output patch planes. Secondly, it stores entire rows of complete shifted and merged patch planes so that they can be read directly back into the image memory 302 in page mode.

Figure 8:
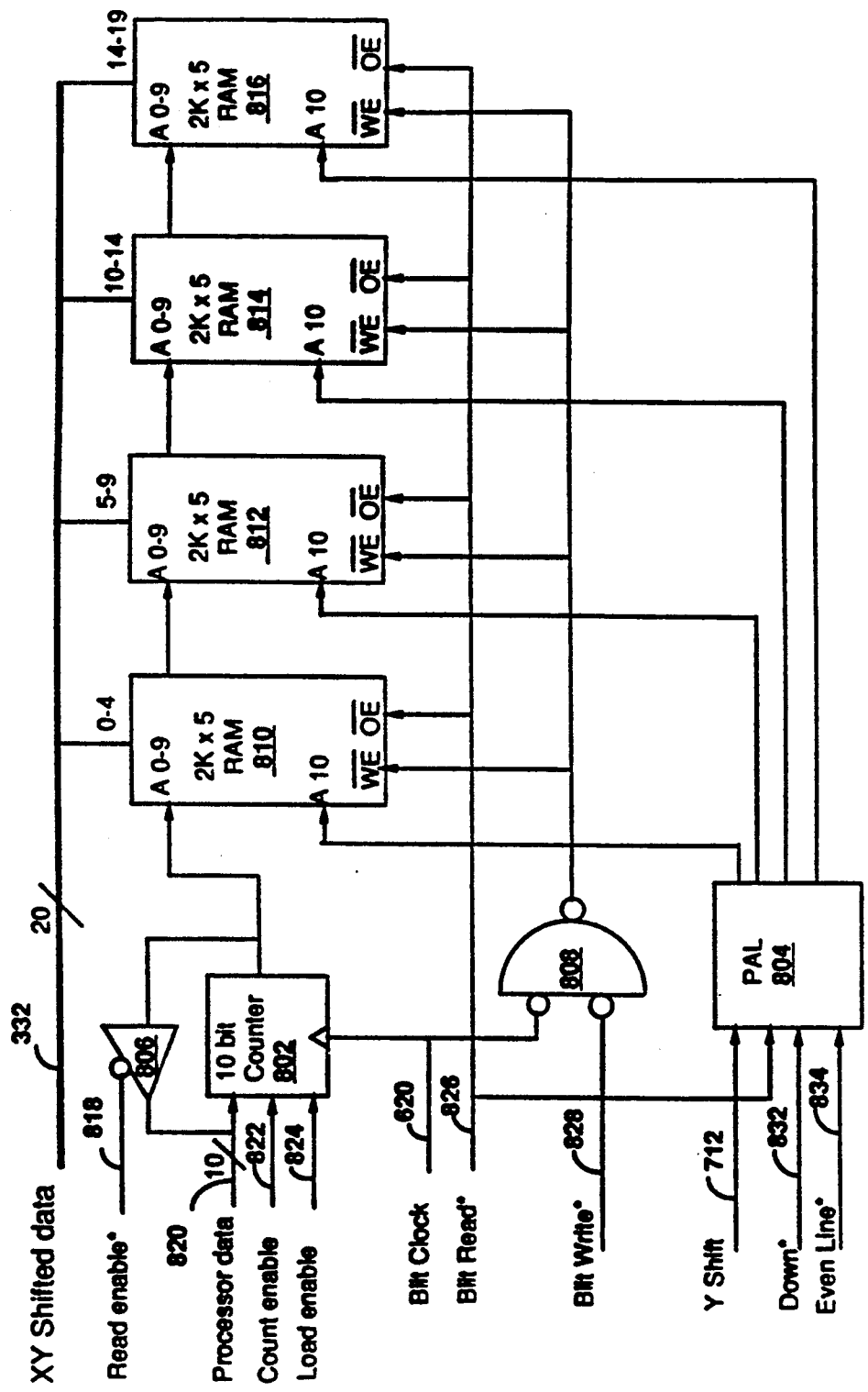
FIG. 8 is a more detailed block diagram of a preferred embodiment of the address generator 333 and line Storage RAM 318 blocks of FIG. 3 for implementing the Y merge and the page mode accessing functions of the present invention.

The operation of the line storage RAM can be better understood by reference to FIG. 8. FIG. 8 shows both the Address Generator 333 and the line storage RAM 318. The address generator 333 includes a 10 bit counter 802, a programmable logic array (PAL) 804 and tristate buffer 806. The Line storage RAM 318 includes write enable logic 808 and four 2K×5 random access memories 810,812,814,816 (the Blit RAMs). The graphics processor 308 supplies several data and control lines to the address generator 333 and line storage RAM 318. These lines include a diagnostic read enable line 818, 10 processor data lines 820, a count enable line 822, a counter load enable line 824, the blit clock line 620, a Blit Read* line 826, a Blit Write* line 828, the 2 Y shift control lines 712, a Down control line 832 and an Even control line 834.

The line storage RAM 318 operates in two modes. A Blit read mode in which a complete image row of patch planes is read from the Blit RAMs, and a blit write mode in which a complete image row of patch planes is written into the blit RAMs.

The Blit write mode will first be explained. In operation a complete row of patch planes sequentially appear on the XY shifted data bus 332. One XY shifted patch plane will be placed on the bus 332 from the Y shift logic every Blit Clock cycle. Prior to processing the line of patches, the graphics processor loads the 10 bit counter 802 with an initial address value (usually zero) by putting the initial address on the processor data bus 820 and asserting a load enable signal on line 824. Once the initial value has been loaded and the first valid patch plane is on the XY shifted data bus 332, the load enable signal is unasserted and a count enable signal is asserted on line 872. The 10 bit counter data is incremented by the cycling of the blit clock 1004 on line 620. The counter data is used as the address for the 10 lower order address bits of the blit RAMs 810,812,814,816. The tristate buffer 806 is used for diagnostic purposes and can be used by the graphics processor 308 to read back the counter address data by asserting the read enable* signal (a low true signal). Asserting this signal will put the counter data on the processor data bus lines 820.

Prior to the beginning of the blit write cycle the Blit write signal is asserted low on line 828 at the input of the write enable logic. This will allow the blit clock 1004 (line 620) to write enable the RAMs 810,812,814,816 when valid patch plane data is at their data inputs via the XY shifted data bus 332. During the Blit Write cycle, the PAL 804 will either set or reset the higher order address bit on each of the Blit RAMs depending on the control data input to it from the graphics processor, in order to correctly form complete output patch planes in the blit RAM.

It should be noted that during a time domain multiplexed operation the Blit RAM counter 802 (explained within) is clocked twice as fast as it would be for a single phase (non time domain multiplexed operation) and the Blit RAM stores two (as opposed to one) patch planes every patch cycle.

The Blit Read mode is similar. The 10 bit counter 802 is loaded by the graphics processor 308 and then count enabled. The Blit Read* signal on line 826 is then asserted (low true) thereby output enabling the Blit RAMs. The Blit Write* signal (line 828) is held high (unasserted) therefore write disabling the Blit RAMs. Under control of data from the PAL 804 all of the Blit RAMs' higher order address bit are either set or reset in order to read complete output plane patches from the blit RAM.

It should be noted that each Blit RAM is dedicated to one row of the patch planes. The row 1 RAM 810 receives or writes only the 1st row of each XY shifted patch plane data bus, i.e. bits 0 through 4 of the XY shifted data bus, the row 2 RAM 812, receives or writes only the 2nd row of each XY shifted patch plan i.e. bits 5 through 9, the row 3 RAM 814, only the 3rd row of each XY shifted patch plane, i.e. bits 10 through 14 and the row 4 RAM 816, only the 4th row of each XY shifted patch plane, i.e. bits 14 through 19.

The PAL 804 is used to properly enable the Blit RAMS during both the blit read and blit write modes. It can be seen from FIG. 8 that the PAL 804 supplies the higher order address bit of each of the blit RAMs. This, in effect, means that each RAM can be thought of as having two separately addressable areas. The first area being addressed when the PAL sets the Blit RAM's higher order address bit high, and the second area being addressed when the PAL sets it low. These areas will be respectively referred to as the first and second address areas. Each Blit RAM stores one row (5 bits) of the patch plane data. One address area is used to store patches that are being completed while the other address area is used to store patches being started.

Assume that several rows of 5×4 patches are to be Y shifted by a given number N, and merged with the next contiguous patch in the Y direction. The line storage RAM will handle this operation in several steps.

The exact address manipulations necessary to merge in Y will depend on the amount of Y shift and the direction of vertical traversal of the rectangular region being processed. A typical Y shift and merge operation can be explained using the example of a rectangular source image region being processed such that the destination image region is above the source image region. In order to properly perform the raster operation, the source rectangle must be processed from the top down. The reason for this can be understood when it is considered that the source and destination image regions can be overlapped. The top down processing is performed in order to avoid overwriting the overlapping area before it is processed.

In the example, assume that the destination pixels within the patch are offset by N pixels above the source patch pixels. When shifting up, the PAL 804 will consider row 1 of a patch is the bottom row and row 4 is the top row. The explanation below will follow that convention.

The first step is a priming step. The first line of patch planes arrives at the Line Storage RAM 318 having been shifted (by the Y shift logic 316) up in the Y direction by N rows. For all of the patches in the first source image line, shifted rows 1 through N are loaded into the first address area of the associated Blit RAMs, while rows N+1 through 4 are loaded into the second address area of the associated Blit RAMs. At the end of this step, the Blit RAM's second address area will contain the rows of the patch planes that are not needed to form an output patch and so will never be read from the blit RAM. The first address areas will contain the first row or rows of the patch planes which are to be eventually output to the image memory.

The next step is a patch formation step. For this step, the PAL 804 reverses the higher order addressing of the Blit RAMs. During this step a second line of circularly Y shifted patch planes arrives from the line storage RAMs from the Y shift logic 316. This time, shifted rows 1 through N of the second complete source image line are stored in the second address area of their associated Blit RAMs, while patch plane rows N+1 through 4 are stored in the first address areas of their associated Blit RAMs. At the end of this step, the first address areas of the Blit RAMs will contain one complete line of patch planes. The second address areas of the Blit RAMs will contain the first N rows of the next line of patch planes to be copied.

The next step is a patch plane read step. The Blit RAMs are read enabled and the patch plane data from within the first area of all the Blit RAMs is read. As has been stated, the first address area contains a full display row of complete patches at this point, thereby enabling the Graphics Processor 308 to read an entire patch row in page mode.

The next step is another patch formation step. For this step, the PAL 804 once again reverses the higher order addressing of the Blit RAMs. A new display row of circularly Y shifted patch planes arrives from the line storage RAMs from the Y shift logic. Rows 1 through N are stored in the first address areas of their associated Blit RAMs, while patch plane rows N+1 through 4 are stored in their associated Blit RAMs' second address areas. At the end of this step, the second address areas of the Blit RAMs contain one complete row of patch planes. The first N rows of the next line of patch planes to be copied are stored in the first address areas of their associated Blit RAMs.

The next step is another patch plane read step. The Blit RAMs are read enabled. This time the patch plane data from within second address areas of all the Blit RAMs is read. As has been stated, the second address areas contain a full row of complete patches at this point, enabling the Graphics Processor 508 to read an entire line (patch row) in row address mode.

The patch plane formation and patch plane read steps then continue in alternating order until the entire block of data has been copied. More genericly, the operation of the algorithm for a Y shift of N steps is as follows:

A. A PRIMING STEP—Write the first N rows of each patch plane into the first address area of the Blit RAMs. Write the next 4−N rows of each patch plane into the Blit RAM's second address areas.

B. A FIRST PATCH PLANE FORMATION STEP—Write the first N rows of each patch plane into the second address area of the Blit RAMs. Write the next 4−N rows of each patch plane into the first address area of the Blit RAMs.

C. A FIRST PATCH PLANE READ STEP—Read the first address area of the Blit RAMs in page mode.

D. A SECOND PATCH PLANE FORMATION STEP—Write the first N rows of each patch plane into the first address area of the Blit RAMs. Write the next 4−N rows of each patch plane into the second address area of the Blit RAMs.

E. A SECOND PATCH PLANE READ STEP—Read the second address area of the Blit RAMs in page mode.

F. REPEAT STEPS B through E for the total number of patch rows having data to be copied.

Note that if the first line read actually contains all the rows than are needed for the first output line, (taking into account possible masked writes for the first output row), the priming step is not necessary.

The above algorithm can also be used when shifting down N rows, given that when shifting down the patch will be processed from bottom to top. In the case where the destination image region is below the source image region the PAL 804 will consider the top row of each patch plane as the first row and the bottom row as the fourth row. In that case, the reader should follow this second numbering convention. It should be mentioned that you would never shift down and process downwards (or vice versa) as you would be in danger of copying invalid data if the source and destination patches are overlapping.

The PAL 804 is programmed to correctly form the high address bit for each of the Blit RAMs for each step. In order to accomplish this, it utilizes several control and lines from the graphics processor 308. These include the Y shift control lines (2 bits), the Down* control line, the Even* control line and the Blit Read* control line. The Y shift control lines 712 are used to carry the Y shift amount (N in this example). These lines carry the same Y shift signals used by the Y shift logic 316. The graphics processor asserts the Even Line* (low) for every even row of patch planes and high for every odd row of patch planes. In this manner, the PAL 804 is able to keep track of which step is occurring. The PAL 804 also uses the Blit read signal to determine which is the current mode (write or read). The Down* control line 832 is used to convey to the PAL 804 information as to which direction the reads of patch rows are progressing (i.e. up or down). A low signal on this line is used to signify that the read is progressing from the top of the image memory to the bottom, a one is used to signify a bottom to top read. When in read mode the PAL 804 will select the same address area in all the RAMs, (i.e. the area in which the latest output patch row has been formed). In write mode, the various inputs are used to merge the correct rows in the appropriate areas to form complete output patches.

j) Logic Unit

The Logic Unit 317 is preferably an Arithmetic Logic Unit (ALU). The presently preferred Logic Unit includes five 74AS181's ALUs available from Texas Instruments. The purpose of the ALU is to perform Boolean operations between each source and destination plane.

When logic operations are being performed, the destination patch must be read into the input patch register 312 before the output patch is read out of the Line Storage RAM 318. The destination patch is read directly after the source patch and both the source and destination planes will appear at the inputs of the ALU 316 at effectively the same time. This does mean that it is not possible to perform page mode operations during writing the row to the image memory 302, however the destination is still read in page mode.

Advantageously, when writing to video RAMs (such as the RAMs in the preferred image memory 302), the reading of the destination patch can be avoided by using the internal logic mode of the RAMs. If set into logic mode the Hitachi vrams will perform any logical operation between the input data and the ram data during a normal write cycle.

The operation of the video RAMs is generally described in the HITACHI IC MEMORY DATA BOOK, 1986 version, (available from Hitachi, Ltd of Japan and through U.S. based Hitachi sales offices), which in its entirety is incorporated by reference herein as if printed in full below.

k) Output Multiplexer

The Output multiplexer 324 is essentially a 20 bit 2:1 mux having its select inputs provided by the graphics processor 308. The output multiplexer 324 allows any plane of an externally provided patch (e.g. from another synchronized Blit Processor) to be inserted in the place of any plane of the source patch. The externally provided plane can be inserted whether or not X and/or Y shifting operations are performed on the source plane. It should be understood that the selection between the external plane and the source plane is made under control of the graphics processor 308.

l) Output Patch Register

The output patch register 330 (FIG. 13) operates in a similar manner as the input patch register 312. Several signals, preferably generated by the graphics processor 308, are used to control the output register logic PAL 1302 so as to cause a selected plane (20 bits) of XY shifted data to be put into its proper place in the 160 bit patch. In this case, the PAL 1302 will select one of the eight output registers 1308, 1310, 1312, 1314, 1316, 1318, 1320, 1322 in which to store its processed patch plane depending on the state of the control lines at its input.

The output register PAL control lines include: the three phase 1 output plane select lines 1304 which will cause the PAL 1302 to select a register for a given plane in phase 1 of a time domain multiplexed operation, the three phase 2 output plane select lines 1306, which will cause the PAL 1302 to select a given plane for phase 2 of a time domain multiplexed blit operation; the Dual* line 930 (low true), used to tell the PAL 1302 whether a single phase or dual phase operation is to be performed; the Phase 1* line 932 which is used to tell the PAL 1302 which phase of a time domain multiplexed operation is occurring so that it will properly choose between its phase 1 and phase 2 plane select inputs; and, the register write enable line 1324, which is used to disable all loads to the output registers when the blit processor is reading data from the image memory.

The blit clock 1004 (formed by the graphics processor 308) is used by the PAL 1302 to form rising edges on the register clock inputs at the correct time to load data into the appropriate plane register. In a single phase operation only one rising edge will be generated per patch cycle, in a two phase operation two rising edges will be generated. The write enable input to the PAL is used to disable all loads to the output registers when the blit processor is reading data from the image memory.

It should be understood that the output register output enables all 8 planes of patch data onto the 160 bits of the image memory data bus 306. However only one plane will be valid in a single phase operation, or two planes will be valid in a two phase operation. Only the valid planes are written to the image memory by the graphics processor 308 write enabling only the appropriate image memory planes for writing.

The image memory plane enable function is preferably implemented in the image memory 302 itself. Each of the Video RAMs within the preferred image memory are used to store four planes. However the video RAMs have an internal write enable feature whereby any of the planes can be write disabled. The contents of a plane protect register within the graphics processor 308 is presented to the data lines of the chips during the write cycle and the VRAMs internally write disable the appropriate planes. In other types of image memories, not using VRAMs, each plane of the image is often stored using a distinct set of RAM chips. In that case, write enabling a certain subset of planes is performed by gating the write signals. The write signal to each plane is effectively AND gated to the relevant bit of an 8 bit plane enable register.

Figure 13:
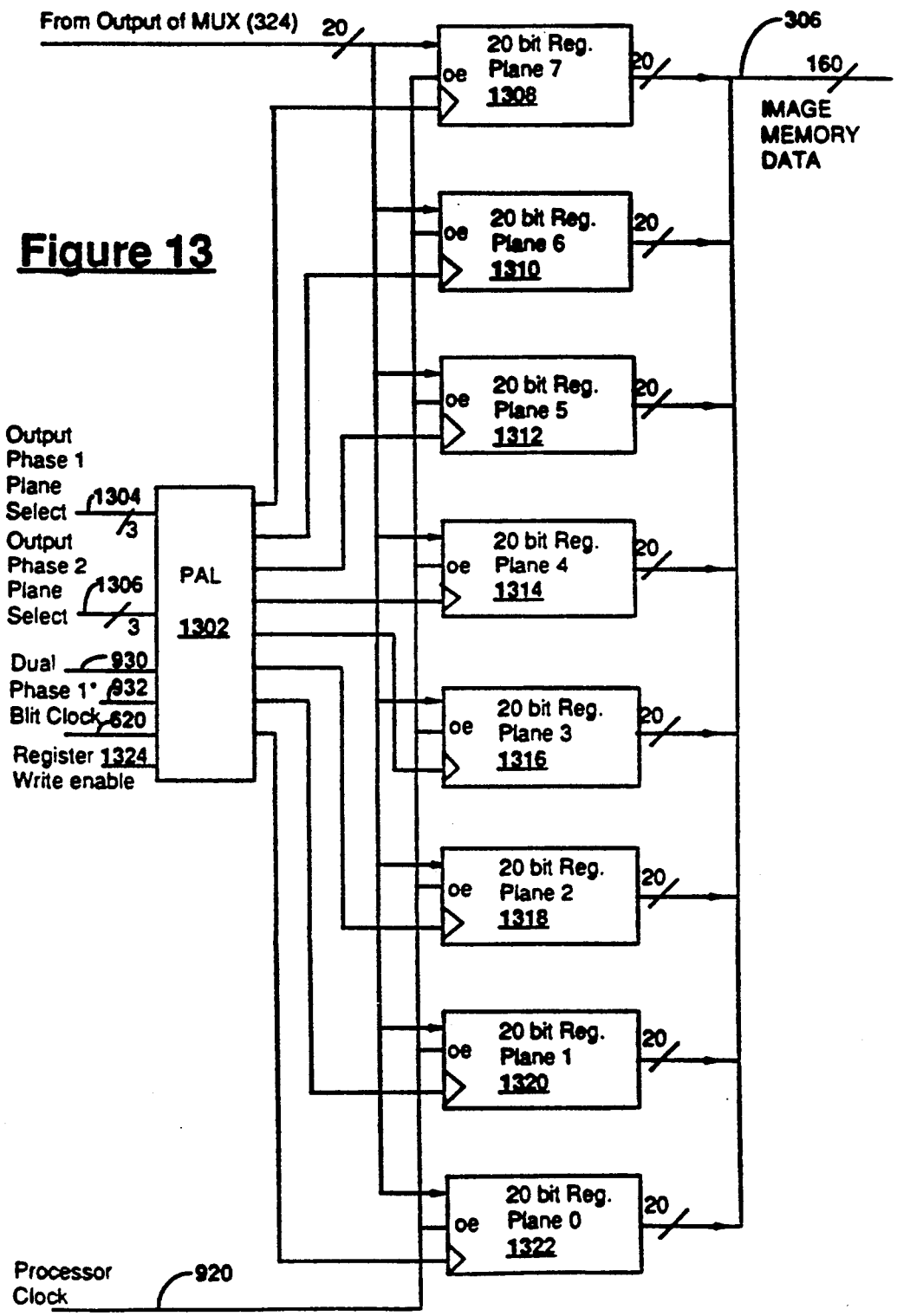
FIG. 13 is a more detailed block diagram of a preferred embodiment of the output register block 330 of FIG. 3.

Advantageously, because the input register plane selects 926,928 (FIG. 9) are independent from the output register plane selects 1304,1306 (FIG. 13). This feature enables inter-plane copies, (i.e. copying a source from one plane to a destination on another plane) to be accomplished. Such can be useful for performing shift operations on multi-bit pixels, or for copying 1 (or more) bit images between planes in a frame store with a greater number of planes (this can be useful for storing a very large 1 bit image in an 8 bit frame store for example). To do inter-plane copies the processor utilizes the independent control of source and destination planes in the input and output patch registers to put the processed plane into an independently selected plane register within the output register logic.

m) Write Masking

Figure 14:
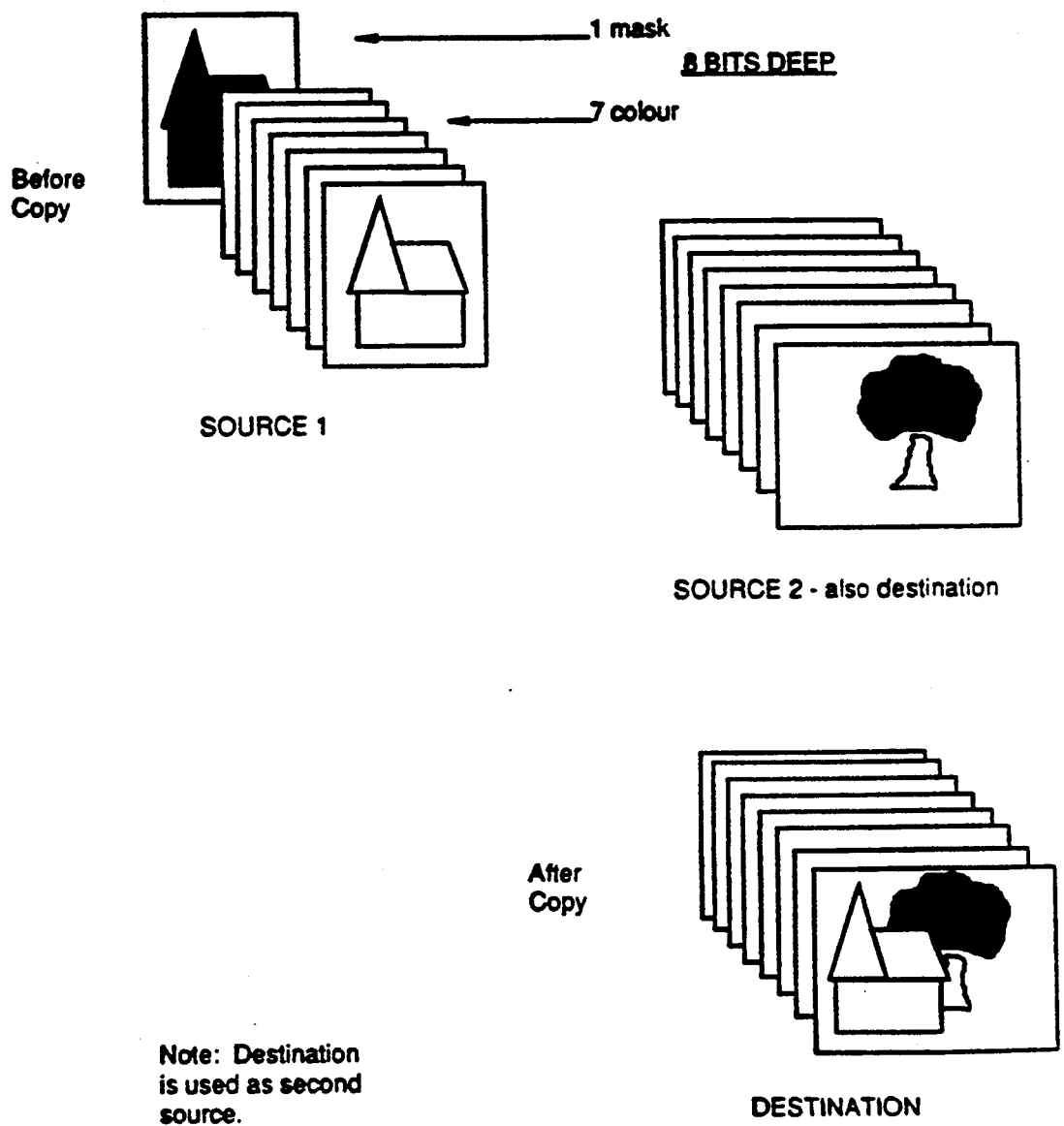
FIG. 14 is a pictorial representation of a write masked operation performed by the present invention.
Figure 15:
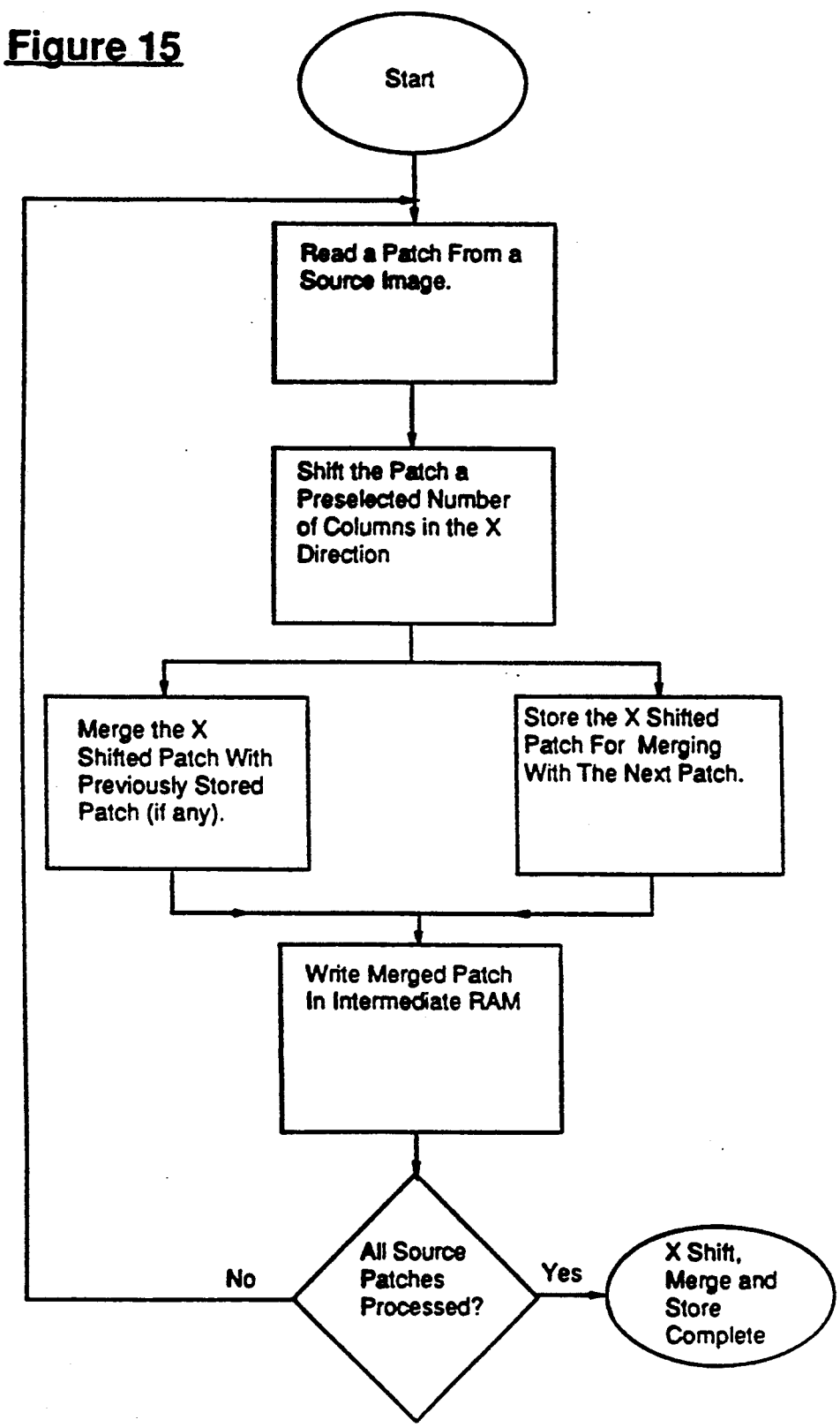
FIG. 15 is a general flow diagram showing representative steps involved in the X shift and merge function and method of the present invention.
Figure 16:
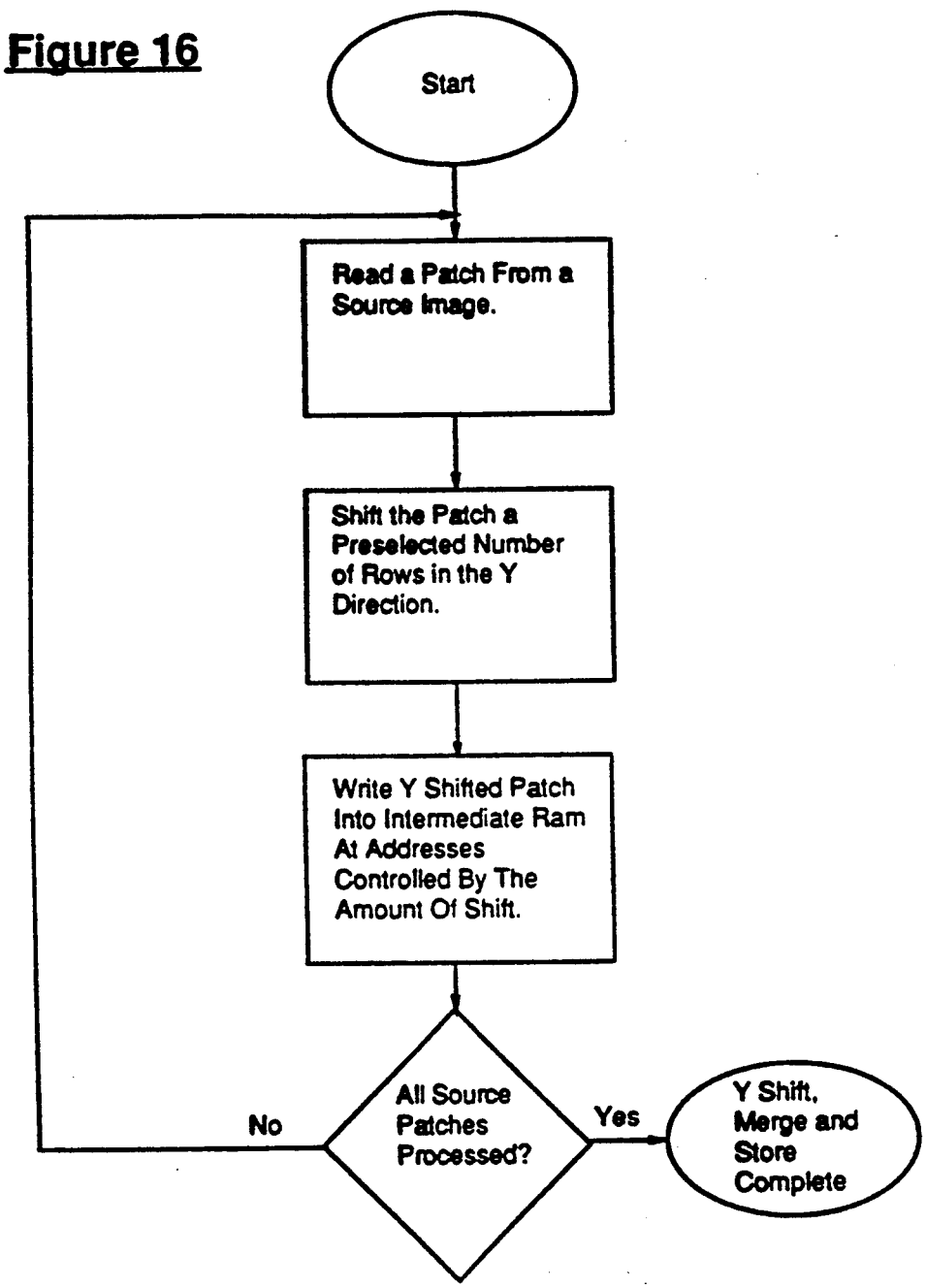
FIG. 16 is a general flow diagram showing representative steps involved in the Y shift and merge function and method of the present invention.
Figure 17:
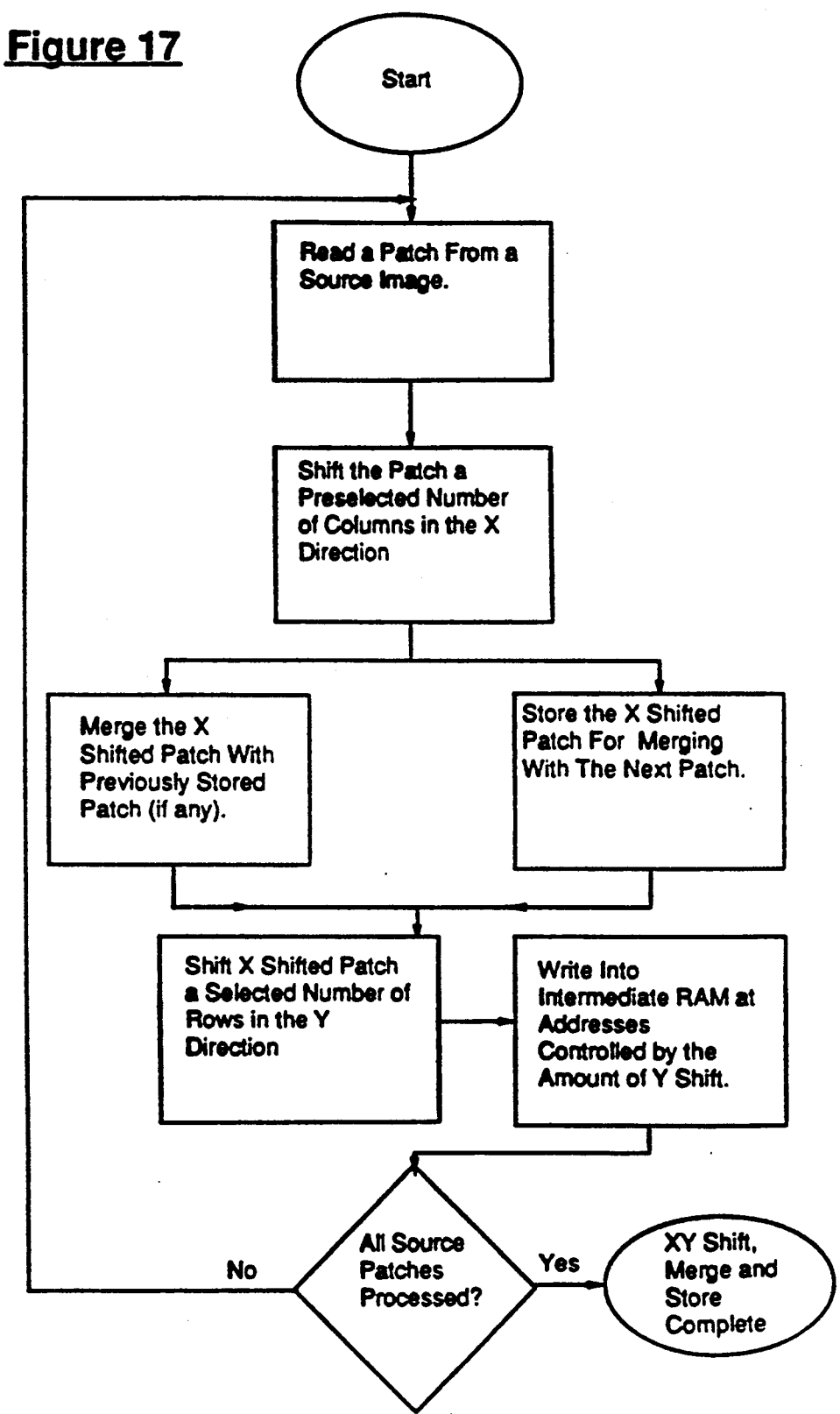
FIG. 17 is a general flow diagram showing representative steps involved in the XY shift and merge function and method of the present invention.
Figure 18:
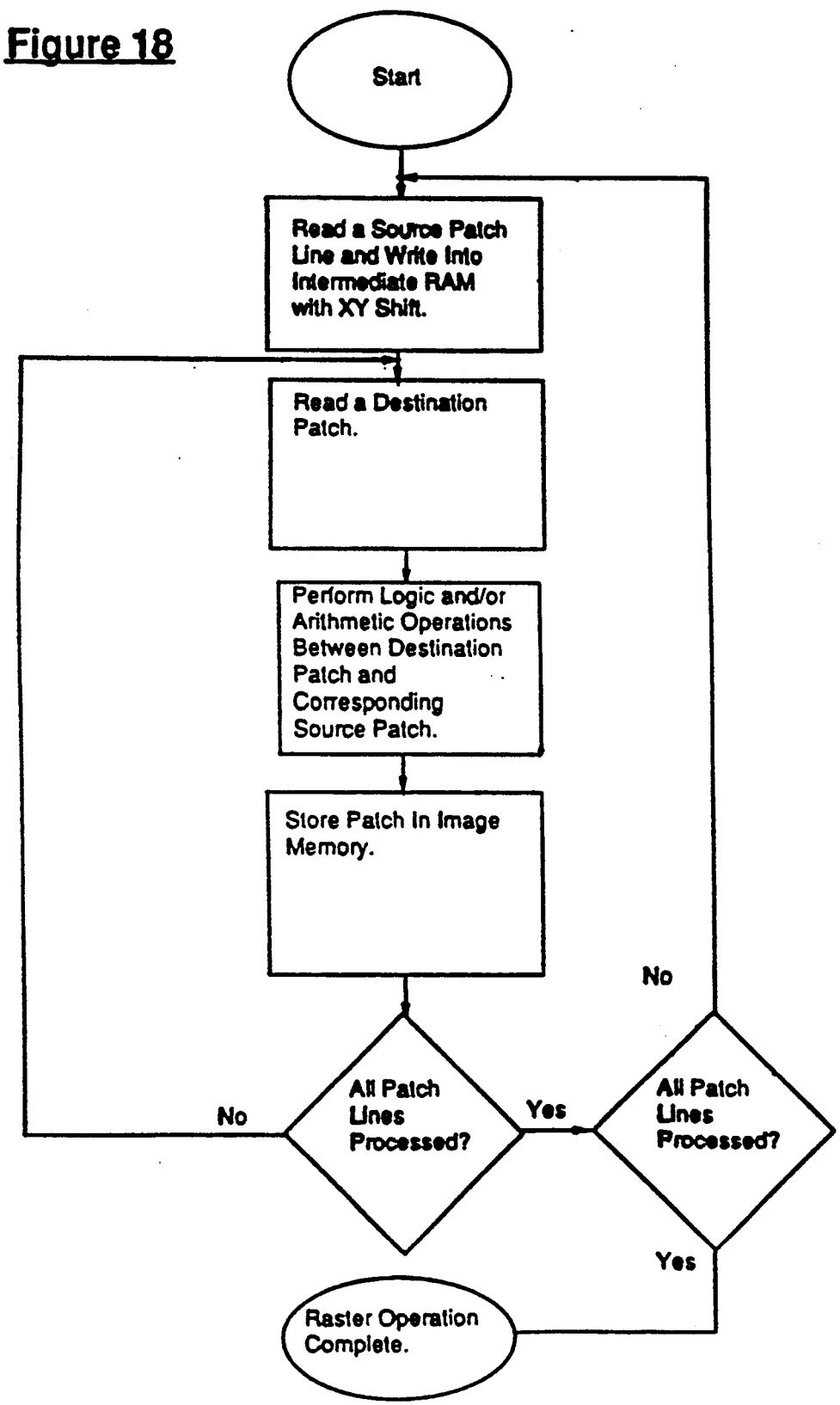
FIG. 18 is a general flow diagram showing representative steps involved in the logical and/or arithmetic operations between the source patches and the destination patches.

The write mask register 320 is used by the graphics processor 100 to generate a mask for the destination area. The utility of the mask register can be best demonstrated by reference to FIG. 14. Assume a source area 1402 is to be copied to a destination area 1404. Further assume that it is desired that a part of the destination be unobscured by the source in the finally copied image 1406. Under unmasked conditions, the Blit processor would copy the entire rectangular source image area 1402 and overlay it on the destination image 1404. It can easily be understood that this will not yield the desired result.

Write masking is also used for another purpose. The top and bottom patch rows and the left and right patches of every row (line) of patches possibly require a masked write if the destination boundaries do not fall on exact patch boundaries.

In order to properly copy over just the required areas of the source image, it is necessary to prevent parts of the source being copied. The map holding the copy enable information for each pixel can be stored using one plane (referred to as the mask plane) of the source image. This plane (within each individual source patch) can be loaded into the write mask register 320 via buffer 326 and can be used to mask out an area along contours of any shape within each patch plane. Such an operation is referred to as a masked copy and will yield the desired destination image 1106.

It should be understood that a masked copy can only be performed in systems using time domain multiplexing. This is so because mask data for each patch must be available to load into the write mask register as an image data patch is loaded into the output patch register. This allows the writing of pixels from each output patch to be qualified by the corresponding source mask that has been correctly shifted and merged to the same destination position as the image data passing through the bit processor. It can be seen that a masked copy requires that only one image plane can be processed along with the mask plane, hence doubling the number of passes to process a multiple plane image.

The mechanics of a masked copy can vary from system to system. In the presently preferred embodiment, each pixel position uses a separate RAM bank in the image memory from all the other pixel positions. In the preferred image memory there are 20 pixel positions each corresponding to one position within the 5×4 patch format (see FIG. 4). Hence if it is required to write to only a selected subset of the patch pixels on a patch write then one of the enabling RAM signals (preferably the Column Address Strobe) is gated so that it doesn't reach the disabled RAM banks. Each bit of the 20 bit write mask register 320 is used by the graphics processor 308 to gate one CAS line. In the preferred embodiment the gating is accomplished in a PAL by effectively "ANDing" the write mask bits with the Column Address Strobes. Of course, as is conventional, various buffering and glue logic is used within the graphics processor to accomplish this. It should be understood that although this method of accomplishing a write mask is used in the preferred graphics processor, it is contemplated that other methods of write masking would accomplish the same result.

It should be understood that there are two different patch masking operations in this invention. The first operation is masking the top, bottom rows of the destination if the boundaries are not patch aligned. The second operation is performing a masked copy and bringing the mask plane through the shift merge logic. When doing the top row of a masked copy the edge mask is "ANDed" together with the data mask. This is done in the graphics processor 308 by reading the mask data out of the blit processor, ANDing it with the current edge mask and writing the result to the write mask register.

During masked logic operations it is necessary that the Blit Logic Unit 317 performs a different operation in each phase. The Logic Unit performs the desired logic operation for the image data, but must pass the mask data straight through. To achieve this there is a separate phase 1 opcode and a phase 2 opcode supplied to the Logic Unit 317 by the graphics processor. The opcodes are selected by the phase1* signal.

n) Page Mode Addressing

Like most dynamic type memories, the Video RAMs within the image memory 502 have a page access mode whereby the Row Address Strobe (RAS) may be held stable and only the Column Address Strobe (CAS) is cycled. Operation in this mode will save about 120 ns out of 240 ns for each row address access. The Blit Processor makes page mode operations possible because it stores an entire address row of data in each operative cycle, thereby allowing the processed data to be read an entire row at a time without the necessity to change the RAS address. Page mode operation is well known in the art. The Blit architecture advantageously allows the programmer or system designer to use it so as to speed up raster operations.

o) Shift Calculation

As has been stated, the shift and merge logic can shift and merge in the X and Y directions by a given number of places (i.e. any number greater than zero and less than the patch dimensions). In the case of the preferred 5×4 patch dimensions, the x shift is calculated by subtracting the X position of a pixel within the source patch from the desired X position of that pixel within the destination patch and adding 5 if the result is negative. The Y shift depends on the direction in which patches are being read. If a source area is being read from top to bottom, the position of a pixel within a patch in the destination area is subtracted from the pixels position in its source patch. Four is added if the result is negative. The total result is then subtracted from four to get the Y shift. If the copy is from bottom to top then the source position is subtracted from the destination position and 4 is added if the result is negative.

For other patch dimensions (other than 5×4) the same type of calculations are performed except the constants are altered to reflect the patch dimensions. In other words, in the X direction instead of 5 being added or subtracted the Patch X dimension would be added or subtracted where called for. In the Y direction, instead of 4 being added, subtracted or subtracted from, the Patch Y dimension value would be used. In other words to calculate the shift values for a patch of H pixels in the X direction and Pixels in the Y direction the reader should substitute H and V for 5 and 4 respectively.

III. Plane Swapping and Bit Position Manipulation

In the previous sections, the shift and merge functions in the X and Y directions have been explained. Advantageously, the shift function can be performed without the merge function as well, so as to allow the bits within each pixel of a patch to be exchanged, replaced, and generally moved around in the patch. In other words, if a patch is thought of as a three dimensional array (having dimensions of 5×4×8 in the case of the preferred patch), the present system and method can be utilized to replace or move in any dimension (X, Y or Z) any bit of the patch.

a. Bit Position Manipulation

The X and Y shift logic can be used to move bits around in a given plane (i.e. intraplane manipulation). For shifting columns of bits up or down, the Y shift logic 316, can be used in its present form. This will allow any given plane of a patch to be shifted up or down by a selected number of rows, on a pixel basis. This amounts to shifting only one bit position in each of the twenty pixels in a complete patch. Because planes are processed by the Y shift logic one plane at a time, some planes can be shifted while others are not.

The line storage RAM 318, can also be used in this process. Normally, the line storage RAM is used to merge vertically contiguous patches. If desired, however, the line storage RAM could be used to merge any one plane or group of planes of a patch with the original patch data itself. This can be accomplished because the line storage RAM collects a complete line and does not write it back into image memory until a Blit RAM write has been initiated. Further, any number of rows of any number of planes within any patch could be replaced with data from another line as opposed to a vertically contiguous merge.

The X shift and merge logic 314 could work similarly with some slight modification. Normally, the decoder PAL 632 is used to insure that the shift control signals sent to the barrel shifters 602,604,606,608 corresponds to the MUX select inputs. If desired, the decoder PAL could be removed and the shift control data sent to the barrel shifters could work independent from the select data sent to the MUXes. In a simple case, this would allow an a shift without a merge whereby a given plane or group of planes of a patch could be X shifted by an amount.

The result of X and Y shifting without a merge is that any bit can be moved to any position within a plane and that planes can be rotated. Masked writes can be performed to create various effects using this rotation and shifting.

b. Plane Swapping

Advantageously, the present system and method enables planes to be exchanged and swapped (i.e. interplane manipulation). As has been stated, the input patch register 312, has independent plane selects from the output register 330. In a TDM operation, 2 planes could be swapped. In either TDM or non TDM operations some planes could be used to overwrite other planes. This type of operation is performed by having the output register plane selects swapped or be otherwise set different (as desired) to the input plane selects.

The system can also be used to overwrite any number of planes of a first patch with any number of planes from a second patch (interpatch manipulation). By synchronizing another system or raster operation processor (preferably another Blit Processor) with the present system and method, a patch from an external source can be loaded into the output register 330 via the output multiplexer 324 in place of any given patch plane. In effect, this allows the output register to be commonly used for two blit processors that are to write to the same image memory.

Some possible applications for the above features include, mask swapping, changing graphic overlays (i.e. swapping in a grid of one size and then a grid of another size in one plane that will appear as an overlay on the image), and image encoding/decoding.

IV. Modifications and Enhancements

Many modifications and enhancements will now occur to those skilled in the art. For example, eight Blit Processors (or four using TDM) could be run in parallel in order to process a complete eight bit patch plane at a time. In that case, the input register logic could be modified to route each plane in the patches to one of the Blit Processors and the output register logic so as to receive the planes from each blit and to reformat them into a single patch. More Blit processors could be added to process more planes as well. Also, the hardware could be embodied in one or more Application Specific Integrated Circuit (ASIC). Advantageously, processing all of the planes together would allow the blit to perform arithmetic operations as well as logic operations.

In addition, another Line Storage RAM, (the same size as the current line storage RAM), could be used to store a destination line read in page mode so as to avoid having to break the page mode operation to read the destination during logic operations. This RAM would be loaded directly after one row of the image source has been read. The RAM could then be read in parallel with the line storage RAM during write, each RAM supplying one input of the Blit Processors Logic Unit 316. Note that as the destination patches are (of course) aligned to the destination, no shift and merge hardware is necessary whilst loading these RAMs and so the RAMs could be connected directly to the input data bus 304. Such as second line storage RAM, connected to the second input of the logic unit 317 could also be used to perform operations between the source and a second source and have the output sent to a destination (i.e. other than the first or second source). In this case the second line storage RAM would be connected after the shift and merge hardware as the second source patch planes are not necessarily aligned with the destination.

As a further modification, another Line Storage RAM could be used to hold one row of shift/merged mask data. This would enable the blit to avoid having to repeatedly accompany each plane with the mask plane during a masked copy. This RAM would be able to be read directly into the write mask register 320 through a private data bus, without affecting the processing of 2 (or more planes) to the output patch register. To exploit this RAM, the processor would need to process all planes of one output row before proceeding to the next row so that the mask plane would only need to be scanned once. In this case, the Line Storage RAM would need to be 4 times bigger in order to hold all 8 planes of data rather than just two planes (TDM) as now.

Also, a second ALU could be inserted between the output of the logic unit 316 and the input of the write mask register 320. The second ALU would enable the graphics processor 308 to avoid having to "AND" the mask data at the edges of a masked copy. The second input of this ALU would be sourced from the graphics processor 308 with the current edge/corner pattern. The ALU would need a bypass path or be able to be set into pass through mode in order to allow data to be passed directly to the write mask register as now.

Also, the Blit processor could be modified to process all eight planes using time domain multiplexing. This would involve speeding up the Blit clock to be eight times as fast as the processor clock, providing three, phase indicator signal lines (to account for all eight phases), and adding one extra set of registers to the X shift and merge logic 314 for every additional plane to be processed. The line storage RAM 318 would also need to be four times as large as for the current two plane (two phase) TDM operation. For this eight phase operation, all eight planes of a patch would first be X shifted and registers. As the planes for the next patch were provided from the patch input patch register 312, the X shift and merge logic would merge each plane of the second patch with the corresponding plane of the second patch. The decoder pal 632 and X shift control lines 610 would operate just for a 2 phase TDM operation. The output patch register 330 would collect all of the shifted and merged planes and write a complete patch into the image memory. The logic unit would operate just as for 2 phase TDM operation and perform Boolean operations with between the corresponding destination and XY shifted source planes.

V. Conclusion

In light of the above discussion, it should be understood that while the preferred embodiments and certain modifications have been described they should be not be taken limitations on the present invention but only as examples thereof.

V. Schematics and Listings

Schematics and PAL listings for important components of a commercial embodiment of the invention have been provided in appendix A of this specification. Appendix A of this specification in its entirely are incorporated into this application by reference herein as if printed in full below. The contents of Appendix A are subject to the partial waiver of copyright set forth on the front sheet.

APPENDIX A

All of the material in this appendix is subject to copyright protection under the copyright laws of the United States, the United Kingdom, and other countries. The copyright owner has no objection to the facsimile reproduction by any one of the patent disclosure, (including this appendix), as it appears in the Patent and Trademark Office files or records, but otherwise reserves all copyright rights whatsoever.

This appendix has 24 pages including this cover sheet.

LANGUAGE: ABEL title 'bFx Blit Processor Ram Address Controller

```
    X01BRAC    device 'P18P8';  IC U510

X,L,H               = .X., 0, 1;

s0,s1,oe_,odd,down_    pin     2,3,4,6,5;
    a0,a1,a2,a3            pin     19,18,17,12;

" fields s = [s1..s0];
    a = [a0..a3];
    write = oe_;
    read  = !oe_;
    down = !down_;
    up = down_;

" setup the output polarities a0,a1,a2,a3   IsType  'pos';

equations

" address 0 a0 =    write & odd #                        " write - follow odd input
        read & down & odd #                  " read down
        read & up & odd & (s==0) #           " read up
        read & up & !odd & ((s==1) # (s==2) # (s==3)) ;

" address 1 a1 =    write & odd #                        " write - follow odd input
        read & odd & (s==0) #                " read zero shift - follow odd input
        read & down & odd & ((s==2) # (s==3)) # " read down
        read & down & !odd & (s==1) #
        read & up & odd & (s==1) #           " read up
        read & up & !odd & ((s==2) # (s==3)) ;

" address 2 a2 =    write & odd #                        " write - follow odd input
        read & odd & (s==0) #                " read zero shift - follow odd input
        read & down & odd & (s==3) #         " read down
        read & down & !odd & ((s==1) # (s==2)) #
        read & up & odd & ((s==1) # (s==2)) # " read up
        read & up & !odd & (s==3) ;

" address 3 a3 =    write & odd #                        " write - follow odd input
        read & down & odd & (s==0) #         " read down
        read & down & !odd & ((s==1) # (s==2) # (s==3)) #
        read & up & odd ;                    " read up test_vectors
([ oe_, odd,down_, s ] -> [ a ]);

" read even line - shifting downwards

[ L,   L,L, 0 ] -> [ ^B0000 ];
[ L,   L,L, 1 ] -> [ ^B0111 ];
[ L,   L,L, 2 ] -> [ ^B0011 ];
[ L,   L,L, 3 ] -> [ ^B0001 ];
```

" read odd line - shifting downwards

[ L,  H,L, 0 ] -> [ !^B0000 ];
[ L,  H,L, 1 ] -> [ !^B0111 ];
[ L,  H,L, 2 ] -> [ !^B0011 ];
[ L,  H,L, 3 ] -> [ !^B0001 ];

" read even line - shifting upwards

[ L,  L,H, 0 ] -> [ ^B0000 ];
[ L,  L,H, 1 ] -> [ ^B1000 ];
[ L,  L,H, 2 ] -> [ ^B1100 ];
[ L,  L,H, 3 ] -> [ ^B1110 ];

" read odd line - shifting upwards

[ L,  H,H, 0 ] -> [ !^B0000 ];
[ L,  H,H, 1 ] -> [ !^B1000 ];
[ L,  H,H, 2 ] -> [ !^B1100 ];
[ L,  H,H, 3 ] -> [ !^B1110 ];

" write - always follow odd input

[ H,  H,H, 0 ] -> [ ^B1111 ];
[ H,  H,L, 1 ] -> [ ^B1111 ];
[ H,  H,H, 2 ] -> [ ^B1111 ];
[ H,  H,L, 3 ] -> [ ^B1111 ];
[ H,  L,H, 0 ] -> [ ^B0000 ];
[ H,  L,L, 1 ] -> [ ^B0000 ];
[ H,  L,H, 2 ] -> [ ^B0000 ];
[ H,  L,L, 3 ] -> [ ^B0000 ];

end title 'bFx Blitter Operation Controller
       LANGUAGE: ABEL

X01BOC   device   'P16L8';  IC U520

X,L,H            = .X., 0, 1;

pop0,pop1,pop2,pop3      pin    3,4,5,6;
           sop0,sop1,sop2,sop3      pin    7,8,9,1;
           p1p_,p2p_,phase1         pin    11,13,2;
           op0,op1,op2,op3          pin    12,19,18,17;

" define phases phase2 = !phase1;

" define fields pop = [pop3..pop0];
       sop = [sop3..sop0];
       op  = [op3..op0];

equations

" select correct operation according to phase and register bits

!op =   phase1 & !p1p_ & !pop #      " phase 1 primary
        phase1 &  p1p_ & !sop #      " phase 1 secondary
        phase2 & !p2p_ & !pop #      " phase 1 primary
        phase2 &  p2p_ & !sop ;      " phase 1 secondary test_vectors
([ phase1, p1p_, p2p_, pop, sop ] -> [ op ]);

" phase 1 primary

[ H, L, H, ^H5, ^H3 ] -> [ ^H5 ];
[ H, L, L, ^HA, ^H3 ] -> [ ^HA ];

" phase 2 primary

[ L, H, L, ^H5, ^H3 ] -> [ ^H5 ];
[ L, L, L, ^HA, ^H3 ] -> [ ^HA ];

" phase 1 secondary

[ H, H, H, ^H5, ^H3 ] -> [ ^H3 ];
[ H, H, L, ^HA, ^HB ] -> [ ^HB ];

" phase 2 secondary

[ L, H, H, ^H5, ^H3 ] -> [ ^H3 ];
[ L, L, H, ^HA, ^HB ] -> [ ^HB ];

end

LANGUAGE: ABEL title 'bFx Blitter controller

X02BC   device    'P18P8'; IC U500

X,L,H             = .X., 0, 1;

fxe_,be_,rbe_,c1,c80,c2,c10     pin     2,7,9,3,4,5,16;
    dual_,rwe_,cce_,wcle_,smle_     pin     8,6,15,1,11;
    wcl_,rw_,smck,p2_,cc           pin     12,19,18,17,13;

equations

" shift merge clock

!smck = !fxe_ & !be_ & !smle_ & !c1 #      " single and double phase
       !fxe_ & !be_ & !smle_ & !dual_ & !c80 ; " dual phase only " ram counter count cc = !fxe_ & !be_ & !cce_ & dual_ & !c10 #    " single phase
     !fxe_ & !be_ & !cce_ & !dual_ ;        " dual phase " ram write !rw_ = !fxe_ & !be_ & !rwe_ & dual_ & !c2 #    " single phase
     !fxe_ & !be_ & !rwe_ & !dual_ ;        " dual phase " write cache load
" Note that delayed phase 1 load is only enabled if smle_ is low !wcl_ = !fxe_ & !be_ & !wcle_ & dual_ & !c2 #   " single phase
     !fxe_ & !be_ & !wcle_ & !dual_ #       " dual phase
     !fxe_ & !rbe_ & !wcle_ & !dual_ & c2 & !smle_ ; " delayed first phase " pal version of phase 2 signal !p2_ = !dual_ & !c2 #           " dual phase
    dual_ ;                  " single phase test_vectors
([ fxe_,be_,dual_, c1,c80,c2,c10, rwe_,cce_,wcle_,smle_ ] ->

```
                                            [ rw_,cc,wcl_,smck ]);

" no selects

[ H,H,L,  L,L,L,L,  L,L,L,L ] -> [ H,L,H,H ];
[ L,H,L,  L,L,L,L,  L,L,L,L ] -> [ H,L,H,H ];
[ H,L,L,  L,L,L,L,  L,L,L,L ] -> [ H,L,H,H ];
[ L,L,L,  L,L,L,L,  H,H,H,H ] -> [ H,L,H,H ];

" shift merge clock

[ L,L,H,  H,H,H,H,  H,H,L,H ] -> [ H,L,H,H ];    " single phase
[ L,L,H,  H,H,L,H,  H,H,L,H ] -> [ H,L,L,H ];
[ L,L,L,  H,H,H,H,  H,H,L,H ] -> [ H,L,L,H ];    " dual phase
[ L,L,L,  H,H,L,H,  H,H,L,H ] -> [ H,L,L,H ];

" ram write

[ L,L,H,  H,H,H,H,  L,H,H,H ] -> [ H,L,H,H ];    " single phase
[ L,L,H,  H,H,L,H,  L,H,H,H ] -> [ L,L,H,H ];
[ L,L,L,  H,H,L,H,  L,H,H,H ] -> [ L,L,H,H ];    " dual phase
[ L,L,L,  H,H,H,H,  L,H,H,H ] -> [ L,L,H,H ];

" counter count

[ L,L,H,  H,H,H,H,  H,L,H,H ] -> [ H,L,H,H ];    " single phase
[ L,L,H,  H,H,H,L,  H,L,H,H ] -> [ H,H,H,H ];
[ L,L,L,  H,H,H,L,  H,L,H,H ] -> [ H,H,H,H ];    " dual phase
[ L,L,L,  H,H,H,H,  H,L,H,H ] -> [ H,H,H,H ];

test_vectors
([ fxe_,be_,rbe_,dual_, c1,c80,c2,c10, rwe_,cce_,wcle_,smle_ ] ->
                                            [ rw_,cc,wcl_,smck ]);

" write cache load

[ L,L,H,H,  H,H,H,H,  H,H,L,H ] -> [ H,L,H,H ];    " single phase
[ L,L,H,H,  H,H,L,H,  H,H,L,H ] -> [ H,L,L,H ];
[ L,L,H,L,  H,H,L,H,  H,H,L,H ] -> [ H,L,L,H ];    " dual phase
[ L,L,H,L,  H,H,H,H,  H,H,L,H ] -> [ H,L,L,H ];

" delayed write cache load

[ H,H,L,L,  H,H,H,H,  H,H,L,L ] -> [ H,L,H,H ];    " no enable
[ L,H,L,H,  H,H,H,H,  H,H,L,L ] -> [ H,L,H,H ];    " single phase
[ L,H,L,H,  H,H,L,H,  H,H,L,L ] -> [ H,L,H,H ];
[ L,H,L,L,  H,H,L,H,  H,H,L,L ] -> [ H,L,H,H ];    " dual phase
[ L,H,L,L,  H,H,H,H,  H,H,L,H ] -> [ H,L,H,H ];    " dual but no smle_
[ L,H,L,L,  H,H,H,H,  H,H,L,L ] -> [ H,L,L,H ];

end

LANGUAGE : ABEL title 'bFx Blitter Source Controller

X01BSC    device    'P16L8';  IC U456

X,L,H              = .X., 0, 1;

pos0,pos1,pos2                    pin    2,3,4;
        pts0,pts1,pts2                    pin    5,6,7;
        dual_,phase1                      pin    8,9;
        c_7,c_6,c_5,c_4,c_3,c_2,c_1,c_0   pin    12,13,14,15,16,17,18,19;

phase2 = !phase1;
        sing   = dual_;
```

```
" define fields pos = [pos2..pos0];
        pts = [pts2..pts0];
        c_  = [c_7..c_0];

equations

" each cache enabled seperately

!c_7 =  !dual_ & phase1 & (pos == 7) #   " dual phase
        !dual_ & phase2 & (pts == 7) #
         sing  & (pts == 7) ;            " single phase !c_6 =  !dual_ & phase1 & (pos == 6) #   " dual phase
        !dual_ & phase2 & (pts == 6) #
         sing  & (pts == 6) ;            " single phase !c_5 =  !dual_ & phase1 & (pos == 5) #   " dual phase
        !dual_ & phase2 & (pts == 5) #
         sing  & (pts == 5) ;            " single phase !c_4 =  !dual_ & phase1 & (pos == 4) #   " dual phase
        !dual_ & phase2 & (pts == 4) #
         sing  & (pts == 4) ;            " single phase !c_3 =  !dual_ & phase1 & (pos == 3) #   " dual phase !dual_ & phase2 & (pts == 3) #
         sing  & (pts == 3) ;            " single phase !c_2 =  !dual_ & phase1 & (pos == 2) #   " dual phase
        !dual_ & phase2 & (pts == 2) #
         sing  & (pts == 2) ;            " single phase :c_1 =  !dual_ & phase1 & (pos == 1) #   " dual phase
        !dual_ & phase2 & (pts == 1) #
         sing  & (pts == 1) ;            " single phase !c_0 =  !dual_ & phase1 & (pos == 0) #   " dual phase
        !dual_ & phase2 & (pts == 0) #
         sing  & (pts == 0) ;            " single phase test_vectors
([ dual_, phase1, pos, pts ] -> [ c_ ]);

" phase 1 selects in single phase

[ H, H, ^H0, ^H0 ] -> [ ^B11111110 ];
[ H, H, ^H0, ^H1 ] -> [ ^B11111101 ];
[ H, H, ^H0, ^H2 ] -> [ ^B11111011 ];
[ H, H, ^H0, ^H3 ] -> [ ^B11110111 ];
[ H, H, ^H0, ^H4 ] -> [ ^B11101111 ];
[ H, H, ^H0, ^H5 ] -> [ ^B11011111 ];
[ H, H, ^H0, ^H6 ] -> [ ^B10111111 ];
[ H, H, ^H0, ^H7 ] -> [ ^B01111111 ];

" phase 2 selects in single phase

[ H, L, ^H0, ^H0 ] -> [ ^B11111110 ];
[ H, L, ^H0, ^H1 ] -> [ ^B11111101 ];
[ H, L, ^H0, ^H2 ] -> [ ^B11111011 ];
[ H, L, ^H0, ^H3 ] -> [ ^B11110111 ];
[ H, L, ^H0, ^H4 ] -> [ ^B11101111 ];
[ H, L, ^H0, ^H5 ] -> [ ^B11011111 ];
[ H, L, ^H0, ^H6 ] -> [ ^B10111111 ];
[ H, L, ^H0, ^H7 ] -> [ ^B01111111 ];
```

" phase 1 selects in dual phase

```
[ L, H, ^H0, ^H0 ] -> [ ^B11111110 ];
[ L, H, ^H1, ^H0 ] -> [ ^B11111101 ];
[ L, H, ^H2, ^H0 ] -> [ ^B11111011 ];
[ L, H, ^H3, ^H0 ] -> [ ^B11110111 ];
[ L, H, ^H4, ^H0 ] -> [ ^B11101111 ];
[ L, H, ^H5, ^H0 ] -> [ ^B11011111 ];
[ L, H, ^H6, ^H0 ] -> [ ^B10111111 ];
[ L, H, ^H7, ^H0 ] -> [ ^B01111111 ];
```

" phase 2 selects in dual phase

```
[ L, L, ^H0, ^H0 ] -> [ ^B11111110 ];
[ L, L, ^H0, ^H1 ] -> [ ^B11111101 ];
[ L, L, ^H0, ^H2 ] -> [ ^B11111011 ];
[ L, L, ^H0, ^H3 ] -> [ ^B11110111 ];
[ L, L, ^H0, ^H4 ] -> [ ^B11101111 ];
[ L, L, ^H0, ^H5 ] -> [ ^B11011111 ];
[ L, L, ^H0, ^H6 ] -> [ ^B10111111 ];
[ L, L, ^H0, ^H7 ] -> [ ^B01111111 ];
``` end

LANGUAGE: ABEL title 'bFx Blitter Destination Controller

```
    X01BDC   device  'P16L8'; IC U476

X,L,H           = .X., 0, 1;

pod0,pod1,pod2                      pin     2,3,4;
    ptd0,ptd1,ptd2                      pin     5,6,7;
    c1,c80,we_,phase1                   pin     8,9,11,1;
    c_7,c_6,c_5,c_4,c_3,c_2,c_1,c_0 pin         12,13,14,15,16,17,18,19;
```

" define fields

```
    pod = [pod2..pod0];
    ptd = [ptd2..ptd0];
    c_  = [c_7..c_0];
``` equations

" each cache enabled seperately

```
!c_7 =   phase1 & (pod == 7) & !we_ & !c80 #    " phase 1
        !phase1 & (ptd == 7) & !we_ & !c1 ;    " phase 2

!c_6 =   phase1 & (pod == 6) & !we_ & !c80 #    " phase 1
        !phase1 & (ptd == 6) & !we_ & !c1 ;    " phase 2

!c_5 =   phase1 & (pod == 5) & !we_ & !c80 #    " phase 1
        !phase1 & (ptd == 5) & !we_ & !c1 ;    " phase 2

!c_4 =   phase1 & (pod == 4) & !we_ & !c80 #    " phase 1
        !phase1 & (ptd == 4) & !we_ & !c1 ;    " phase 2

!c_3 =   phase1 & (pod == 3) & !we_ & !c80 #    " phase 1
        !phase1 & (ptd == 3) & !we_ & !c1 ;    " phase 2

!c_2 =   phase1 & (pod == 2) & !we_ & !c80 #    " phase 1
        !phase1 & (ptd == 2) & !we_ & !c1 ;    " phase 2

!c_1 =   phase1 & (pod == 1) & !we_ & !c80 #    " phase 1
        !phase1 & (ptd == 1) & !we_ & !c1 ;    " phase 2
```

```
!c_0 =   phase1 & (pod == 0) & !we_ & !c80 #    " phase 1
         !phase1 & (ptd == 0) & !we_ & !c1 ;    " phase 2 test_vectors
([ we_, c1, c80, phase1, pod, ptd ] -> [ c_ ]);

" phase 1 select with clock and no enable

[ H, H, L, H, ^H0, ^H0 ] -> [ ^B11111111 ];
[ H, H, L, H, ^H1, ^H0 ] -> [ ^B11111111 ];
[ H, H, L, H, ^H2, ^H0 ] -> [ ^B11111111 ];
[ H, H, L, H, ^H3, ^H0 ] -> [ ^B11111111 ];
[ H, H, L, H, ^H4, ^H0 ] -> [ ^B11111111 ];
[ H, H, L, H, ^H5, ^H0 ] -> [ ^B11111111 ];
[ H, H, L, H, ^H6, ^H0 ] -> [ ^B11111111 ];
[ H, H, L, H, ^H7, ^H0 ] -> [ ^B11111111 ];

" phase 1 select with no clock and enable

[ L, H, H, H, ^H0, ^H0 ] -> [ ^B11111111 ];
[ L, H, H, H, ^H1, ^H0 ] -> [ ^B11111111 ];
[ L, H, H, H, ^H2, ^H0 ] -> [ ^B11111111 ];
[ L, H, H, H, ^H3, ^H0 ] -> [ ^B11111111 ];
[ L, H, H, H, ^H4, ^H0 ] -> [ ^B11111111 ];
[ L, H, H, H, ^H5, ^H0 ] -> [ ^B11111111 ];
[ L, H, H, H, ^H6, ^H0 ] -> [ ^B11111111 ];
[ L, H, H, H, ^H7, ^H0 ] -> [ ^B11111111 ];

" phase 1 select with clock and enable

[ L, H, L, H, ^H0, ^H0 ] -> [ ^B11111110 ];
[ L, H, L, H, ^H1, ^H0 ] -> [ ^B11111101 ];
[ L, H, L, H, ^H2, ^H0 ] -> [ ^B11111011 ];
[ L, H, L, H, ^H3, ^H0 ] -> [ ^B11110111 ];
[ L, H, L, H, ^H4, ^H0 ] -> [ ^B11101111 ];
[ L, H, L, H, ^H5, ^H0 ] -> [ ^B11011111 ];
[ L, H, L, H, ^H6, ^H0 ] -> [ ^B10111111 ];
[ L, H, L, H, ^H7, ^H0 ] -> [ ^B01111111 ];

" phase 2 select with clock and no enable

[ H, L, H, L, ^H0, ^H0 ] -> [ ^B11111111 ];
[ H, L, H, L, ^H0, ^H1 ] -> [ ^B11111111 ];
[ H, L, H, L, ^H0, ^H2 ] -> [ ^B11111111 ];
[ H, L, H, L, ^H0, ^H3 ] -> [ ^B11111111 ];
[ H, L, H, L, ^H0, ^H4 ] -> [ ^B11111111 ];
[ H, L, H, L, ^H0, ^H5 ] -> [ ^B11111111 ];
[ H, L, H, L, ^H0, ^H6 ] -> [ ^B11111111 ];
[ H, L, H, L, ^H0, ^H7 ] -> [ ^B11111111 ];

" phase 2 select with no clock and enable

[ L, H, H, L, ^H0, ^H0 ] -> [ ^B11111111 ];
[ L, H, H, L, ^H0, ^H1 ] -> [ ^B11111111 ];
[ L, H, H, L, ^H0, ^H2 ] -> [ ^B11111111 ];
[ L, H, H, L, ^H0, ^H3 ] -> [ ^B11111111 ];
[ L, H, H, L, ^H0, ^H4 ] -> [ ^B11111111 ];
[ L, H, H, L, ^H0, ^H5 ] -> [ ^B11111111 ];
[ L, H, H, L, ^H0, ^H6 ] -> [ ^B11111111 ];
[ L, H, H, L, ^H0, ^H7 ] -> [ ^B11111111 ];

" phase 2 select with clock and enable

[ L, L, H, L, ^H0, ^H0 ] -> [ ^B11111110 ];
[ L, L, H, L, ^H0, ^H1 ] -> [ ^B11111101 ];
[ L, L, H, L, ^H0, ^H2 ] -> [ ^B11111011 ];
[ L, L, H, L, ^H0, ^H3 ] -> [ ^B11110111 ];
[ L, L, H, L, ^H0, ^H4 ] -> [ ^B11101111 ];
[ L, L, H, L, ^H0, ^H5 ] -> [ ^B11011111 ];
[ L, L, H, L, ^H0, ^H6 ] -> [ ^B10111111 ];
[ L, L, H, L, ^H0, ^H7 ] -> [ ^B01111111 ];
```

LANGUAGE: PALASM2

; Horizontal two-phase shift merger for Blit

CHIP x01bsm PAL32VX10 ICs U480 U481 U482 U483

```
CLK D0 D1 D2 D3 D4 R0 R1 R2 R3 DBUG GND
P1 OQ0 TQ0 OQ1 TQ1 OQ2 TQ2 OQ3 TQ3 OQ4 TQ4 VCC
```

GLOBAL BOQ0 BTQ0 BOQ1 BTQ1 BOQ2 BTQ2 BOQ3 BTQ3 BOQ4 BTQ4

EQUATIONS

; ALL PINS SHIFT RIGHT

; PHASE ONE - BIT 4

```
BOQ4 := P1 * /R3 * /R2 * /R1 * /R0 * D4          ; No shift
      + P1 * /R3 * /R2 * /R1 *  R0 * D3          ; Shift 1 space
      + P1 * /R3 * /R2 *  R1 *  R0 * D2          ; Shift 2 spaces
      + P1 * /R3 *  R2 *  R1 *  R0 * D1          ; Shift 3 spaces
      + P1 *  R3 *  R2 *  R1 *  R0 * D0          ; Shift 4 spaces
      + /P1 * BOQ4                                ; static in phase 2
```

OQ4 = BOQ4                                        ; route register to pin

OQ4.TRST = P1                                     ; enable in phase 1

OQ4.CMBF = VCC                                    ; never register

; PHASE TWO - BIT 4

```
BTQ4 := /P1 * /DBUG * /R3 * /R2 * /R1 * /R0 * D4  ; No shift
      + /P1 * /DBUG * /R3 * /R2 * /R1 *  R0 * D3  ; Shift 1 space
      + /P1 * /DBUG * /R3 * /R2 *  R1 *  R0 * D2  ; Shift 2 spaces
      + /P1 * /DBUG * /R3 *  R2 *  R1 *  R0 * D1  ; Shift 3 spaces
      + /P1 * /DBUG *  R3 *  R2 *  R1 *  R0 * D0  ; Shift 4 spaces
      +  P1 * /DBUG * BTQ4                        ; static in phase 1
      +  DBUG * BOQ4                              ; debug phase 1 output
```

TQ4 = BTQ4                                        ; route register to pin

TQ4.TRST = /P1                                    ; enable in phase 2

TQ4.CMBF = VCC                                    ; never register

; PHASE ONE - BIT 3

```
BOQ3 := P1 * /R3 * /R2 * /R1 * /R0 * D3          ; No shift
      + P1 * /R3 * /R2 * /R1 *  R0 * D2          ; Shift 1 space
      + P1 * /R3 * /R2 *  R1 *  R0 * D1          ; Shift 2 spaces
      + P1 * /R3 *  R2 *  R1 *  R0 * D0          ; Shift 3 spaces
      + P1 *  R3 *  R2 *  R1 *  R0 * D4          ; Shift 4 spaces
      + /P1 * BOQ3                                ; static in phase 2
```

OQ3 = BOQ3                                        ; route register to pin

OQ3.TRST = P1                                     ; enable in phase 1

OQ3.CMBF = /R3                                    ; register

; PHASE TWO - BIT 3

```
BTQ3 := /P1 * /DBUG * /R3 * /R2 * /R1 * /R0 * D3  ; No shift
      + /P1 * /DBUG * /R3 * /R2 * /R1 *  R0 * D2  ; Shift 1 space
      + /P1 * /DBUG * /R3 * /R2 *  R1 *  R0 * D1  ; Shift 2 spaces
      + /P1 * /DBUG * /R3 *  R2 *  R1 *  R0 * D0  ; Shift 3 spaces
      + /P1 * /DBUG *  R3 *  R2 *  R1 *  R0 * D4  ; Shift 4 spaces
      +  P1 * /DBUG * BTQ3                        ; static in phase 1
      +  DBUG * BOQ3                              ; debug phase 1 output
```

```
TQ3 = BTQ3                                              ; route register to pin TQ3.TRST = /P1                                          ; enable in phase 2

TQ3.CMBF = /R3                                          ; register

; PHASE ONE - BIT 2

BOQ2 :=  P1 * /R3 * /R2 * /R1 * /R0 * D2                ; No shift
      +  P1 * /R3 * /R2 * /R1 *  R0 * D1                ; Shift 1 space
      +  P1 * /R3 * /R2 *  R1 *  R0 * D0                ; Shift 2 spaces
      +  P1 * /R3 *  R2 *  R1 *  R0 * D4                ; Shift 3 spaces
      +  P1 *  R3 *  R2 *  R1 *  R0 * D3                ; Shift 4 spaces
      + /P1 * BOQ2                                      ; static in phase 2

OQ2 = BOQ2                                              ; route register to pin

OQ2.TRST = P1                                           ; enable in phase 1

OQ2.CMBF = /R2                                          ; register

; PHASE TWO - BIT 2

BTQ2 := /P1 * /DBUG * /R3 * /R2 * /R1 * /R0 * D2        ; No shift
      + /P1 * /DBUG * /R3 * /R2 * /R1 *  R0 * D1        ; Shift 1 space
      + /P1 * /DBUG * /R3 * /R2 *  R1 *  R0 * D0        ; Shift 2 spaces
      + /P1 * /DBUG * /R3 *  R2 *  R1 *  R0 * D4        ; Shift 3 spaces
      + /P1 * /DBUG *  R3 *  R2 *  R1 *  R0 * D3        ; Shift 4 spaces
      +  P1 * /DBUG * BTQ2                              ; static in phase 1
      +  DBUG * BOQ2                                    ; debug phase 1 output TQ2 = BTQ2                                              ; route register to pin TQ2.TRST = /P1                                          ; enable in phase 2

TQ2.CMBF = /R2                                          ; register

; PHASE ONE - BIT 1

BOQ1 :=  P1 * /R3 * /R2 * /R1 * /R0 * D1                ; No shift
      +  P1 * /R3 * /R2 * /R1 *  R0 * D0                ; Shift 1 space
      +  P1 * /R3 * /R2 *  R1 *  R0 * D4                ; Shift 2 spaces
      +  P1 * /R3 *  R2 *  R1 *  R0 * D3                ; Shift 3 spaces
      +  P1 *  R3 *  R2 *  R1 *  R0 * D2                ; Shift 4 spaces
      + /P1 * BOQ1                                      ; static in phase 2

OQ1 = BOQ1                                              ; route register to pin

OQ1.TRST = P1                                           ; enable in phase 1

OQ1.CMBF = /R1                                          ; register

; PHASE TWO - BIT 1

BTQ1 := /P1 * /DBUG * /R3 * /R2 * /R1 * /R0 * D1        ; No shift
      + /P1 * /DBUG * /R3 * /R2 * /R1 *  R0 * D0        ; Shift 1 space
      + /P1 * /DBUG * /R3 * /R2 *  R1 *  R0 * D4        ; Shift 2 spaces
      + /P1 * /DBUG * /R3 *  R2 *  R1 *  R0 * D3        ; Shift 3 spaces
      + /P1 * /DBUG *  R3 *  R2 *  R1 *  R0 * D2        ; Shift 4 spaces
      +  P1 * /DBUG * BTQ1                              ; static in phase 1
      +  DBUG * BOQ1                                    ; debug phase 1 output TQ1 = BTQ1                                              ; route register to pin TQ1.TRST = /P1                                          ; enable in phase 2

TQ1.CMBF = /R1                                          ; register
```

; PHASE ONE - BIT 0

```
BOQ0 := P1 * /R3 * /R2 * /R1 * /R0 * D0      ; No shift
     +  P1 * /R3 * /R2 * /R1 *  R0 * D4      ; Shift 1 space
     +  P1 * /R3 * /R2 *  R1 *  R0 * D3      ; Shift 2 spaces
     +  P1 * /R3 *  R2 *  R1 *  R0 * D2      ; Shift 3 spaces
     +  P1 *  R3 *  R2 *  R1 *  R0 * D1      ; Shift 4 spaces
     + /P1 * BOQ0                            ; static in phase 2
```

OQ0 = BOQ0                                   ; route register to pin

OQ0.TRST = P1                                ; enable in phase 1

OQ0.CMBF = /R0                               ; register

; PHASE TWO - BIT 0

```
BTQ0 := /P1 * /DBUG * /R3 * /R2 * /R1 * /R0 * D0   ; No shift
     +  /P1 * /DBUG * /R3 * /R2 * /R1 *  R0 * D4   ; Shift 1 space
     +  /P1 * /DBUG * /R3 * /R2 *  R1 *  R0 * D3   ; Shift 2 spaces
     +  /P1 * /DBUG * /R3 *  R2 *  R1 *  R0 * D2   ; Shift 3 spaces
     +  /P1 * /DBUG *  R3 *  R2 *  R1 *  R0 * D1   ; Shift 4 spaces
     +   P1 * /DBUG * BTQ0                         ; static in phase 1
     +  DBUG * BOQ0                                ; debug phase 1 output
```

TQ0 = BTQ0                                   ; route register to pin

TQ0.TRST = /P1                               ; enable in phase 2

TQ0.CMBF = /R0                               ; register

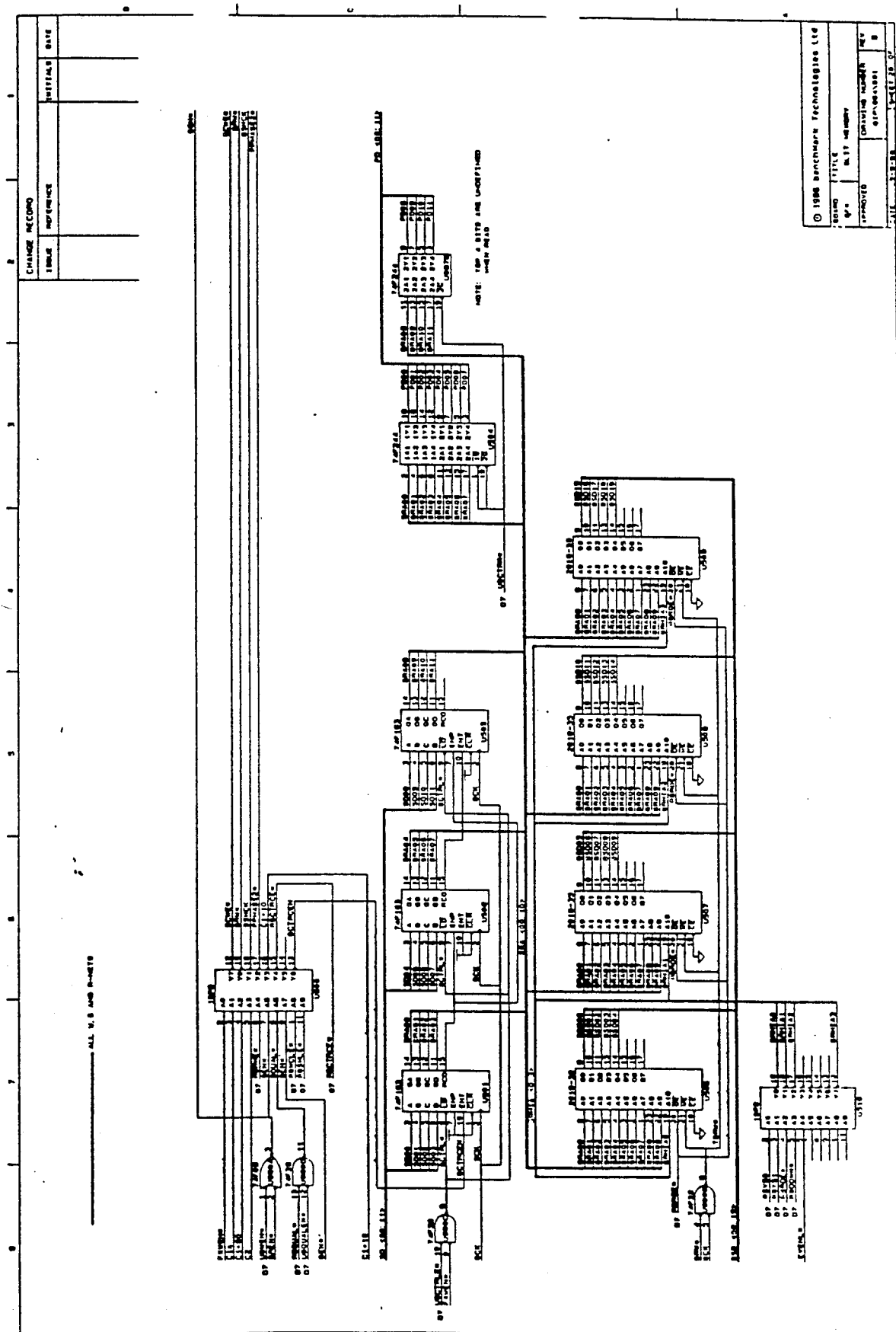

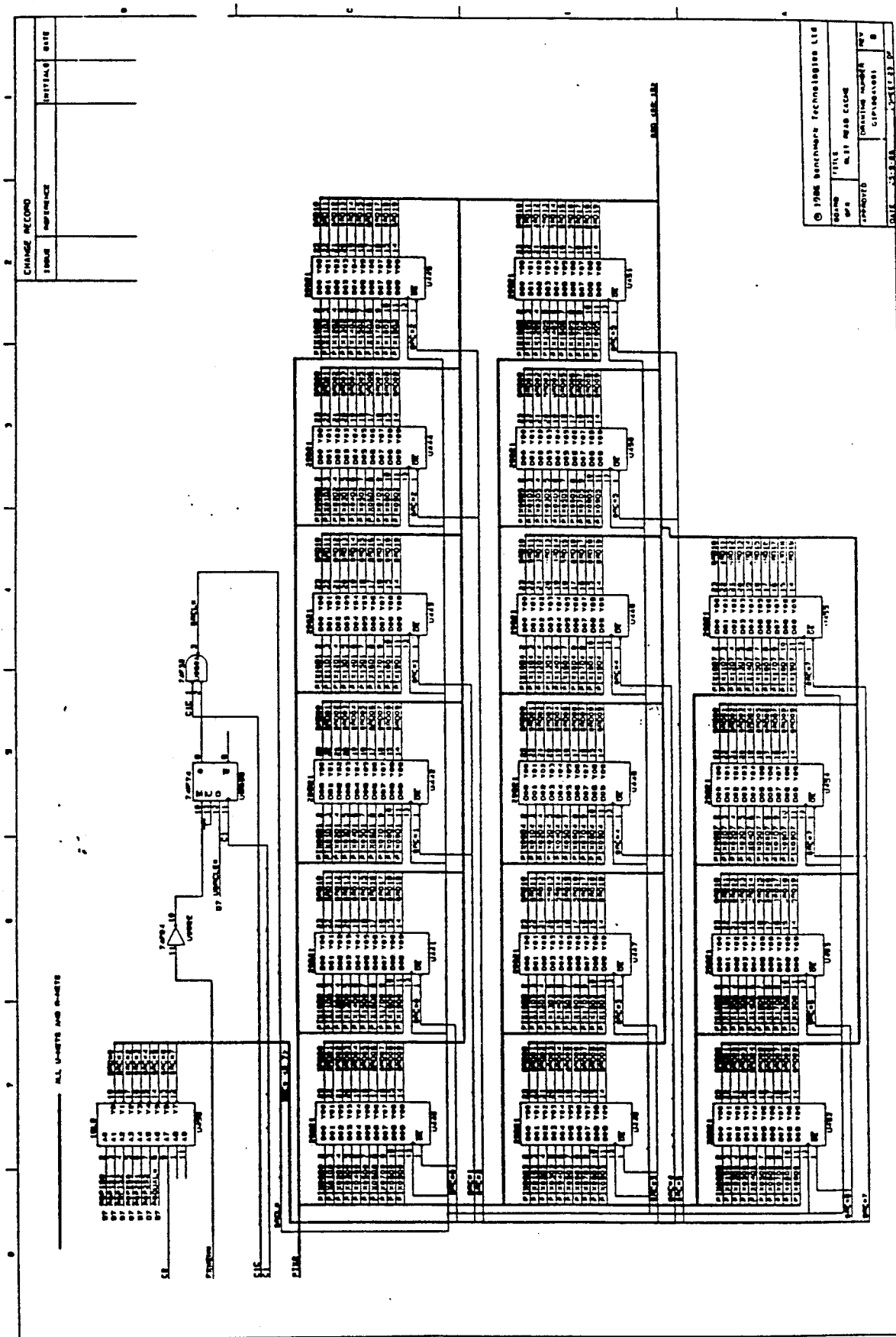

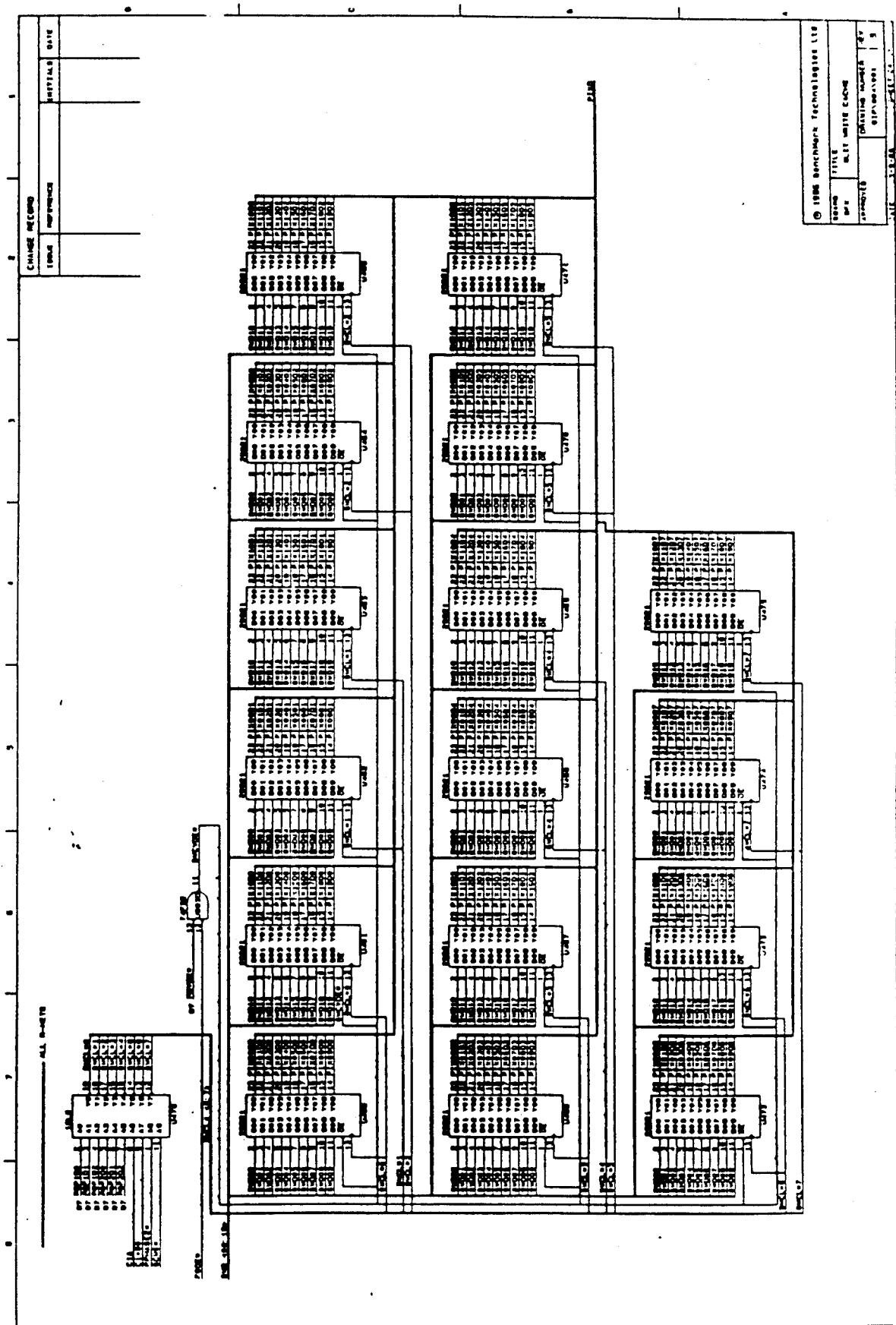

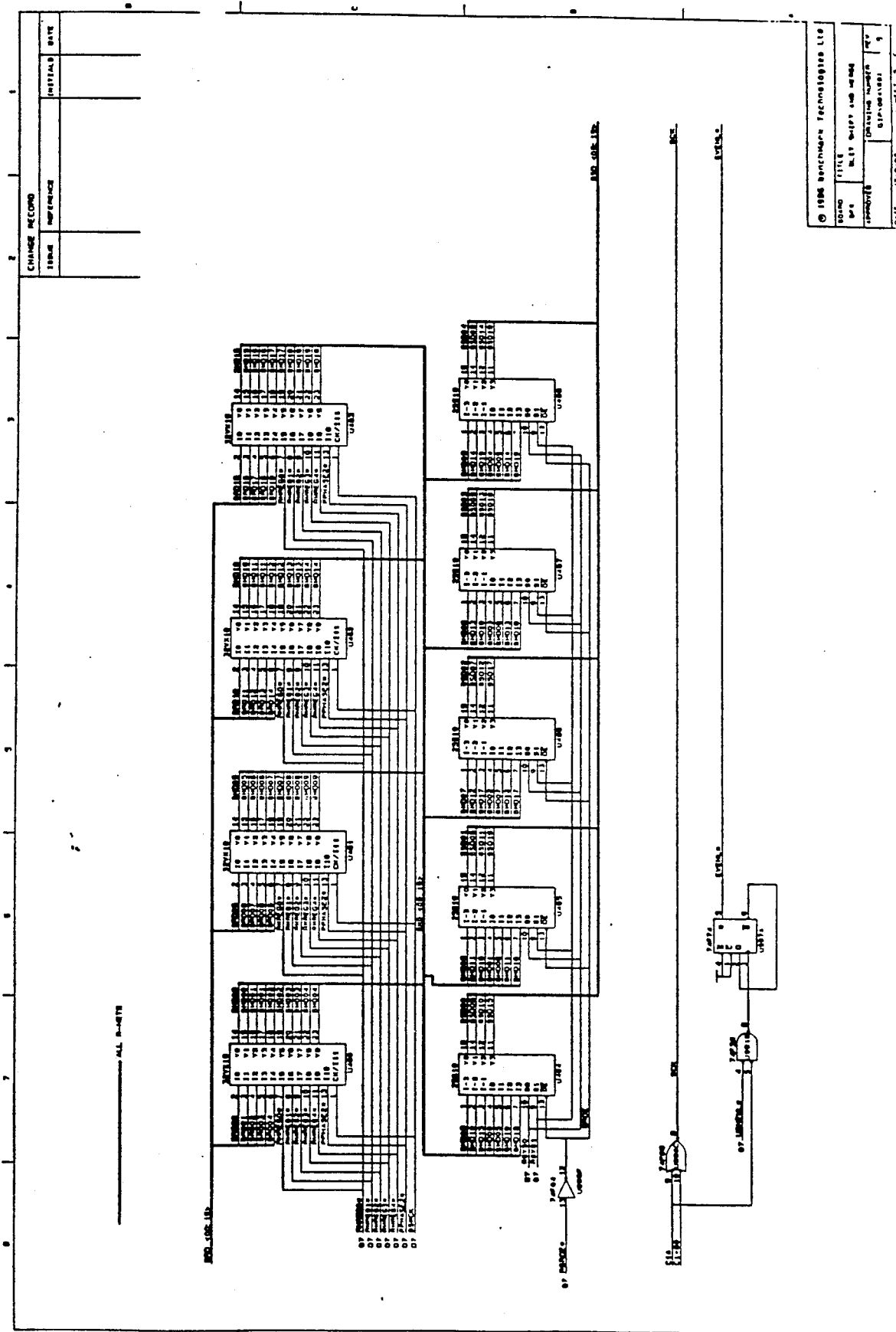

We claim:

1. A graphics processing system for processing image data in which an image is represented by a plurality of patches, each patch representing a two dimensional array of pixels, and each patch having a plurality of planes, the data for each pixel having a respective bit in each plane, wherein the graphics processing system has an image memory, the system comprising:
   (a) first means for isolating a first plane of a first input patch to permit operations to be performed on the bits of said plane, independently of the other planes of said first input patch;
   (b) second means for performing at least one of a Boolean, arithmetic and shift operation on the bits of said first plane to form a modified plane; and
   (c) third means for at least one of storing said modified plane in an output patch and holding said modified plane for subsequent processing by said second means.

2. The system of claim 1, wherein said first means further isolates a second plane of a second input patch to permit operations to be performed on the bits of said second plane, independently of the other planes of said second input patch, said first and second planes being one of:
   (a) the same plane;
   (b) different planes from the same patch; and
   (c) planes from different patches.

3. The system of claim 2, wherein said second means further comprises a fourth means to perform at least one of a Boolean, arithmetic and shift operation on said bits of said first and second planes to form said modified plane.

4. The system of claim 2, wherein said second means further comprises a fourth means for performing a swap operation between said first and second planes by selectively storing said first plane in said second input patch and said second plane in said first input patch.

5. The system of claim 2, wherein said second means further comprises a fourth means for performing a merge operation on said bits of said first and second planes to form said modified plane comprising selected bits of said first and second planes.

6. The system of claim 3, wherein said first and second input patches are contiguous in the image memory, and said modified plane comprising said selected bits of said first and second planes represents a plane of an input patch not falling on an addressable patch boundary in the image memory.

7. The system of claim 5, wherein said fourth means for performing said merge operation comprises at least one of:
   (a) one or more shift registers configured to circularly shift bits in the horizontal direction to form an X shifted plane; and means to merge at least two X shifted planes to form said modified plane; and
   (b) one or more shift registers configured to circularly shift bits in the vertical direction to form a Y shifted plane; and means to merge at least two Y shifted planes to form a said merged plane.

8. The system of claim 2, wherein said third means for storing said modified plane in said output patch further comprises a fourth means to selectively overwrite individual planes of said output patch with said modified patch independently of the other planes of said output patch.

9. The system of claim 8, further comprising a masking means to specify the bits to be overwritten when said modified plane is stored in said output patch.

10. An image processing system for manipulating patch formatted pixel data stored in an image memory and having two or more component planes, each pixel having a respective bit in each plane, said image processing system comprising:
   (a) first means for reading patch data from the image memory;
   (b) second means for separating said patch data into its respective component planes;
   (c) third means for performing at least one of a Boolean, arithmetic, shift and swap operation on the bits of one or more of said respective component planes, independently of other planes of said patch data; and
   (d) fourth means for selectively storing said component planes modified by third means in one or more output patches of the image memory.

* * * * *